(12) United States Patent
Sekino et al.

(10) Patent No.: US 7,952,613 B2
(45) Date of Patent: May 31, 2011

(54) IMAGE BLUR CORRECTING UNIT, IMAGE BLUR CORRECTING DEVICE, IMAGE PICKUP APPARATUS AND PORTABLE EQUIPMENT

(75) Inventors: Shizuo Sekino, Saitama (JP); Hideo Yoshida, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 680 days.

(21) Appl. No.: 11/864,476

(22) Filed: Sep. 28, 2007

(65) Prior Publication Data
US 2008/0085108 A1 Apr. 10, 2008

(30) Foreign Application Priority Data

Sep. 29, 2006 (JP) ................ P2006-269712
Jun. 15, 2007 (JP) ................ P2007-159267
Aug. 31, 2007 (JP) ................ P2007-226557
Aug. 31, 2007 (JP) ................ P2007-226558

(51) Int. Cl.
*H04N 5/228* (2006.01)
(52) U.S. Cl. .................... 348/208.7; 348/340
(58) Field of Classification Search ............ 348/208.99, 348/208.4, 208.7, 340; 396/55
See application file for complete search history.

(56) References Cited

U.S. PATENT DOCUMENTS

| | | | | |
|---|---|---|---|---|
| 5,991,468 A | * | 11/1999 | Murakami et al. | 382/313 |
| 6,486,910 B1 | * | 11/2002 | Kaneda et al. | 348/208.99 |
| 2005/0225646 A1 | * | 10/2005 | Shintani | 348/208.99 |
| 2006/0077260 A1 | * | 4/2006 | Pyo et al. | 348/208.7 |
| 2007/0076098 A1 | * | 4/2007 | Yasuda | 348/208.99 |
| 2007/0183766 A1 | * | 8/2007 | Miyamori et al. | 396/55 |
| 2007/0196087 A1 | * | 8/2007 | Kosaka et al. | 396/55 |
| 2008/0068489 A1 | * | 3/2008 | Watanabe et al. | 348/340 |

FOREIGN PATENT DOCUMENTS

| | | | |
|---|---|---|---|
| JP | 7-274056 A | | 10/1995 |
| JP | 2612371 B2 | | 2/1997 |
| JP | 2005/065090 | * | 3/2005 |
| JP | 2005-326807 A | | 11/2005 |

* cited by examiner

*Primary Examiner* — Gevell Selby
(74) *Attorney, Agent, or Firm* — Birch, Stewart, Kolasch & Birch, LLP

(57) ABSTRACT

In the image blur correcting unit, one end of a flexible board is connected to a sensor board included in a holding module, and the portion of the flexible board that extends at least first from the sensor board extends outwardly from the holding module in a direction oblique to both first and second directions. That is, the flexible board is extended from the vicinity of an axis point which swings least while the holding module is swinging.

26 Claims, 18 Drawing Sheets

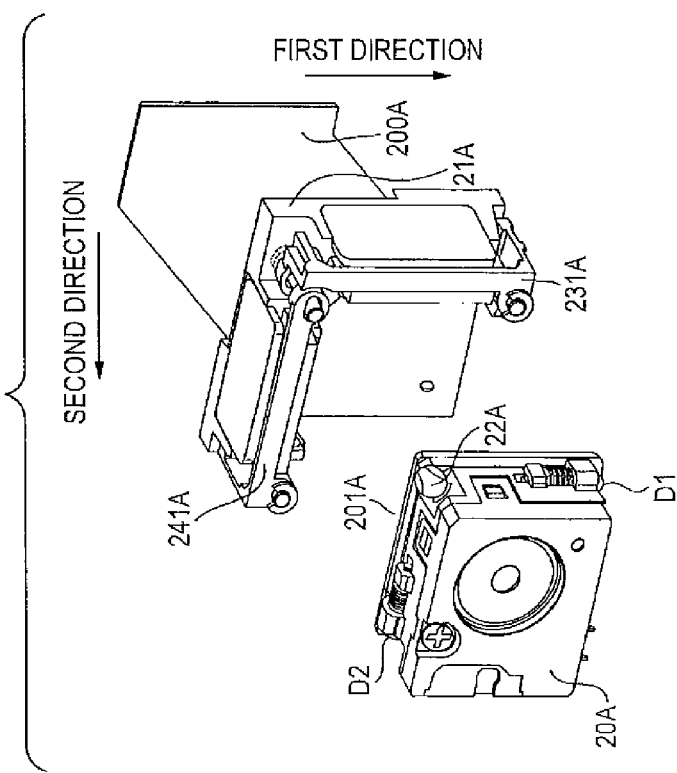
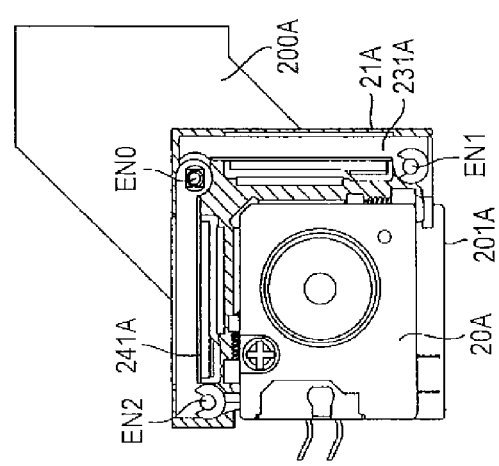
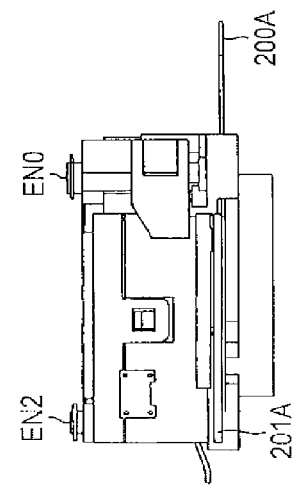

PITCHING

YEWING

PITCHING+ YEWING

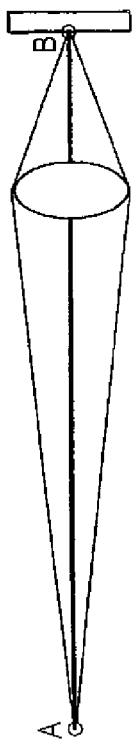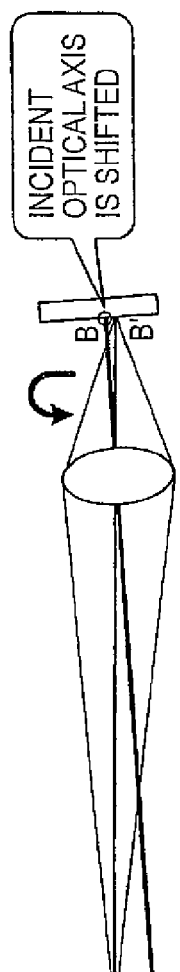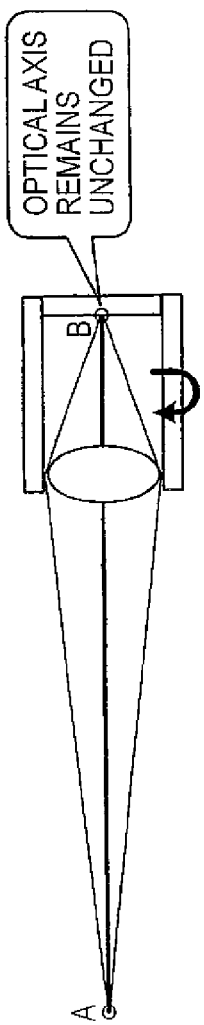
FIG. 16A  NO CAMERA SHAKE
FIG. 16B  CAMERA SHAKE OCCURS
FIG. 16C  UNIT IS ROTATED

IMAGE BLUR CORRECTING UNIT, IMAGE BLUR CORRECTING DEVICE, IMAGE PICKUP APPARATUS AND PORTABLE EQUIPMENT

BACKGROUND OF THE INVENTION

1. Field of the Invention

The present invention relates to: an image blur correcting unit which is suitably used as a camera shake correcting mechanism for an image pickup apparatus such as a digital camera, a camera-equipped portable telephone; an image blur correcting device comprising the image blur correcting unit; an image pickup apparatus comprising the image blur correcting device; and a portable equipment having the image pickup apparatus.

2. Description of the Related Art

In the related art, in digital cameras and the like, various camera shake correcting mechanisms are employed in order to suppress a disturbance of a photographed image due to a camera shake of the user, or the like (see JP-A-7-274056, JP-A-2005-326807 and Japanese Patent No. 2,612,371).

As such camera shake correcting mechanism, in the related art, there is a so called gimbal mechanism in which a holding module for holding an imaging lens can be swung in pitching and yawing directions.

In the gimbal mechanism disclosed in JP-A-7-274056, however, freely rotating rotary joints or the like must be placed in four places, or upper, lower, right, and left portions of a holding module. Therefore, a camera shake correcting mechanism inevitably tends to be increased in size. When the size of the mechanism is tried to be reduced, there arises an inconvenience that bearing portions for the rotary joints, and the like are weakened.

SUMMARY OF THE INVENTION

In order to solve the inconvenience, a driving structure has been proposed (see Japanese Patent Application 2006-169871). In the structure, an outer frame is disposed so as to surround a holding module which holds a lens, and an axis point which is a point along the outer circumference of the outer frame is swingably supported. The outer frame is driven respectively via first and second driving points which are separated from the axis point in respective different first and second directions, and which are along the outer circumference of the outer frame.

Also, the present applicant has proposed and applied a drive structure in which not only an axis point, which is a point existing along the outer periphery of a holding module, is swingably supported but also the holding module is driven through first and second driving points respectively existing along the outer periphery of the holding module and spaced from the axis point in mutually different first and second directions, in the Japanese patent applications 2006-269712, 2006-269713, 2006-269714, 2006-269715 and the like as unpublished patent applications. Further, the present applicant has improved these applications to propose a technology aiming at enhancing the position detecting accuracy of the holding module when the holding module is swinging, as an image blur correcting unit disclosed in the Japanese patent application 2007-035341. When the drive structure proposed in these applications is realized, the size reduction of the image blur correcting unit can be realized, so that the image blur correcting unit can be incorporated into portable equipment.

FIG. 15 is a view showing an image blur correcting unit to which the related-art driving structure is applied.

FIG. 15 is a view of the image blur correcting unit 2 as viewed from the front side. In FIG. 11, shown are components of the image blur correcting unit 2 including: a holding module 20 which holds an imaging lens 10; an outer frame 21 which is disposed so as to surround the periphery of the holding module 20; a first driving portion 23 which is placed on the left side face of the holding module 20 to allow the holding module 20 to be swingable in the yawing direction; a second driving portion 24 which is placed on the upper face of the holding module 20 to allow the holding module 20 to be swingable in the pitching direction; a supporting point 22 which supports the holding module 20 to allow the holding module to be swingable with respect to the outer frame 21 in the pitching and yawing directions; a first spherical engaging portion 201 which is disposed in a part of the holding module 20 to be engaged with the first driving portion 23 via a first sphere 230 that will be described later; and a second spherical engaging portion 202 which is to be engaged with the second driving portion 24 via a second sphere 240 that will be described later.

The first driving portion 23 is configured by: a first coil 234; a first magnet 233; a first support member 231 which supports the first coil 234, and which is swingably supported by the outer frame 21; and a first groove portion 232 which is fixed to an end portion of the first support member 231, and which presses the first sphere 230 mounted on a first spring 235 that drops in a groove of a fixed portion, against the first spherical engaging portion 201 of the holding module 20, thereby supporting the holding module 20.

The second driving portion 24 is configured by: a second coil 244; a second magnet 243; a second support member 241 which supports the second coil 244, and which is swingably supported by the outer frame 21; and a second groove portion 242 which is fixed to an end portion of the second support member 241, and which presses the second sphere 240 mounted on a second spring 245 that drops in a groove of a fixed portion, against the second spherical engaging portion 202 of the holding module 20, thereby supporting the holding module 20.

On the right side of the holding module 20, the first coil 234 which is a wound coil where a wire is wound in a planar shape is fixed to the first support member 231. The first magnet 233 in which two regions that are obtained by anterposteriorly two-dividing the magnet in the optical axis direction of the imaging lens 10 are magnetized so as to have opposite polarities is fixed to a position which is on the inner wall of the right side face of the outer frame 21, and which is opposed to the first coil 234. The electromagnetic force interaction between the first coil 234 and the first magnet 233 causes the holding module 20 to be swung in the yawing direction together with the first coil 234 and the support member fixed to the first coil 234.

On the upper side of the holding module 20, the second coil 244 which is a wound coil where a wire is wound in a planar shape is fixed to the second support member 241. The second magnet 243 which is of the same kind as the first magnet 233, and in which two regions that are obtained by anterposteriorly two-dividing the magnet in the optical axis direction of the imaging lens 10 are magnetized so as to have opposite polarities is fixed to a position which is on the inner wall of the upper side face of the outer frame 21, and which is opposed to the second coil 244. The electromagnetic force interaction between the second coil 244 and the second magnet 243 causes the holding module 20 to be swung in the pitching direction together with the second coil and the support member fixed to the second coil 244.

According to the image blur correcting unit of FIG. 15, even in the case where rotational axes are not disposed in four places, or upper, lower, right, and left portions unlike the related art, when the holding module is driven, the first driving portion 23 swings the holding module 20 together with the outer frame 21 in the yawing direction, and simultaneously the second driving portion 24 swings the holding module 20 about the supporting point 22 together with the outer frame 21 in the pitching direction, whereby the holding module 20 is swung and the optical axis of the imaging lens 10 can be directed in an arbitrary direction.

Here, description will be given in brief of the operation of the above-mentioned image blur correcting unit.

FIGS. 16A to 16C is an explanatory view of the operation of the image blur correcting unit shown in FIG. 15.

FIGS. 16A and 16B show what inconveniences can be produced in the position relationship between the lens and sensor when a shake occurs unless the image blur correcting unit is incorporated. FIG. 16C shows how a shake can be corrected by an image blur correcting unit including a lens and a sensor.

As shown in FIG. 16A, in case where no shake occurs, even if the image blur correcting unit is not incorporated, the optical axis of the lens and the optical axis of the light receiving surface (sensor surface) of the sensor are aligned with each other, whereby the object light image can be formed at a correct position. On the other hand, in case where a shake occurs, as shown in FIG. 16B, when the image blur correcting unit is not incorporated, the lens and sensor surface are rotated in the arrow mark direction to shift the axes of the lens and sensor surface from each other, whereby the object light image cannot be formed a correct position.

In view of this, in case where the image blur correcting unit is incorporated in portable equipment such as a cellular phone with a camera, when a shake occurs, as shown in FIG. 16C, an image blur correcting unit including a lens and a sensor is operated as a gyro, whereby, even when the image pickup apparatus is rotated, the image blur correcting unit is rotated in the opposite direction so that the object light image can be always formed at a correct position on the sensor surface. Thus, in case where the image blur correcting unit is incorporated in the portable equipment such as a cellular phone with a camera, even when the portable equipment is rotated due to the image pickup operation, the attitude of the image blur correcting unit can be always kept in an attitude just before the image pickup operation, thereby being able to carry out a proper image pickup operation.

In order to easily incorporate the image blur correcting unit 2 shown in FIG. 15 into an image pickup apparatus or the like, it may be contemplated to employ the following configuration. In the configuration, a flexible board is used for supplying a drive signal from the external to each of the first and second driving portions 23, 24, and outputting to the external an image signal produced by an image sensor which is disposed in the holding module 20 driven by the driving portions. The flexible board is drawn out from both of driving portions.

Depending on the manner of drawing out the flexible board, however, the swing operation of the holding module 20 applies a stress to the flexible board. Therefore, an inconvenience that the whole or a part of the flexible board is disengaged from a sensor board may occur. Also, there is also a problem that, in order for the holding module 20 to be able to resist a load applied to the holding module 20 from the flexible substrate, it is necessary to apply a large drive force to the holding module 20, which makes it necessary to increase the size of the driving portion.

Also, when incorporating the image blur correcting unit into the portable equipment, a movable portion provided in the image blur correcting unit and a control portion fixed to the inside of a casing must be connected together using a wiring member such as a flexible board.

However, when the movement of the movable portion while it is moving is transmitted to the flexible board, there is a fear that the flexible board can be removed from the control portion or movable portion due to the load of the flexible board. Also, as described above, since the load of the flexible board is applied to the movable portion, in order to resist this load, a driving force to be applied to the movable portion must be increased.

In view of the above-discussed circumstances, it is a first object of the invention to provide an image blur correcting unit in which a stress applied to a flexible board connected to a sensor board and drawn out to the external is reduced, an image blur correcting device comprising the image blur correcting unit, an image pickup apparatus comprising the image blur correcting device, and a portable equipment having the image pickup apparatus.

In view of the above-mentioned circumstances, it is a second object of the invention to provide an image blur correcting unit structured such that a flexible board itself is difficult to deform and the flexible board is difficult to remove from a connecting portion, an image blur correcting device incorporating the image blur correcting unit therein, an image pickup apparatus incorporating the image blur correcting device therein, and portable equipment incorporating the image pickup apparatus therein.

In order to attain the first object, the image blur correcting unit of the invention comprises:

a holding module that holds a lens and a sensor board having an image sensor, the image sensor receiving object light imaged by the lens to produce an image signal;

a support member that swingably supports the holding module in an arbitrary direction at an axis point that is a point on an outer circumference of the holding module;

first and second driving mechanisms that drive the holding module respectively via first and second driving points that are separated from the axis point in respective different first and second directions, wherein the first and second driving points are along the outer circumference of the holding module, the first driving mechanism swings the holding module via the first driving point about a first axis connecting the axis point and the second driving point, and the second driving mechanism swings the holding module via the second driving point about the second axis connecting the axis point and the first driving point; and a flexible board in which its one end is connected to the sensor board and in which its portion that elongates at least first from the sensor board elongates from the holding module toward an outside, in a direction oblique to both the first and second directions.

According to the image blur correcting unit of the invention, in the flexible board, the portion that elongates at least first from the sensor board is drawn out from the holding module toward the outside, in the direction oblique to both the first and second directions.

Thus, even when the holding module swings, the flexible board is pulled out from the vicinity of the above-mentioned axis point, where the swing motion of the holding module is relatively small, in a direction oblique to both the above-mentioned first and second direction, whereby stress to be applied to the connecting portion connected to the sensor board when the holding module is swinging can be reduced and thus the flexible board can be made difficult to remove from the sensor board. Also, since a driving force to be applied to the holding module can be reduced, the driving mechanisms can be reduced in size.

That is, the portion of the flexible board extending first from the sensor board, preferably, may extend outwardly from the axis point of the holding module in a direction oblique to both the first and second directions.

Here, more preferably, the portion of the flexible board extending at least first from the sensor board in the oblique direction may comprise a slit that extends in the oblique direction.

When the slit is formed in the oblique direction where the flexible board is pulled out, even when any stress happens to be applied to the flexible board, such stress can be eased by the slit.

Preferably, the first and second driving points are respectively formed at positions where the second axis and the first axis intersect with each other at an angle of about 90 degrees, and the portion of the flexible board that first elongates from the sensor board elongates from the holding module toward the outside, in a direction which forms an angle of about 45 degrees with respect to both the first and second directions.

The image blur correcting unit is configured so as to correct shakes in directions which are different from each other by 90 degrees, or typically the pitching and yawing directions. In this case, when the flexible board elongates in a direction of about 45 degrees, the applied stress is minimum.

Preferably, each of the first and second driving mechanisms comprises: a magnet that forms a magnetic field; and a coil that is placed in the magnetic field, and, when energized, produces a force for swinging the holding module.

When so-called voice coils each comprising a magnet which forms the magnetic field, and a coil which is placed in the magnetic field, and, which, when energized, produces a force for swinging the holding module are used, the sizes of both the first and second driving mechanisms are reduced. Therefore, a greater effect can be attained in miniaturization of the whole image blur correcting unit.

Preferably, the holding module comprises a spherical convex portion at the axis point, and the support member comprises a spherical concave face which receives the convex portion.

According to the configuration, the structures of bearing portions are simplified and miniaturized. Therefore, a greater effect can be attained in miniaturization of the whole image blur correcting unit.

Preferably, the holding module comprises a spherical convex portion at each of the first and second driving points, the first and second driving mechanisms comprise spherical concave portions that receive the convex portions provided in the first and second driving points, respectively, and the first and second driving mechanisms give a driving force to the convex portions via the concave portions, respectively.

According to the configuration, each of the driving points can be used commonly with a bearing portion, and the structure is simplified. Therefore, a greater effect can be attained in miniaturization of the whole image blur correcting unit.

Preferably, the magnets respectively constituting the first and second driving mechanisms are fixedly supported by the support member, and the coils respectively constituting the first and second driving mechanisms are supported by the support member to be movable in an optical axis direction of the lens, and, when energized, produce a force of the optical axis direction.

According to the configuration, the magnets and coils which are principal members constituting the first and second driving mechanisms are collectively supported by the support member. Therefore, the first and second driving mechanisms, and also the support member can be miniaturized.

Further, preferably, the image blur correcting unit may further comprises a cover that covers the holding module, support member and the first and second driving mechanisms so as to define the outer shape of the image blur correcting unit, the cover having an electromagnetic shield function.

In this case, since the outer shape of the image blur correcting unit is defined by the cover, more effective dimension information can be provided more easily to portable equipment which incorporates the image blur correcting unit. Also, when the cover has the electromagnetic shield function as described above, the image blur correcting unit can be incorporated even in the vicinity of a communication part such as an antenna. This can provide an effect that the image blur correcting unit can be incorporated in any position in the inside of the casing of the portable equipment.

The image blur correcting device of the invention comprises any one of the above-mentioned image blur correcting units, and further comprises:
    a shake detecting portion that detects a shake; and
    a shake controlling portion that, in accordance with a detection result of the shake detecting portion, causes the first and second driving mechanisms to swing the holding module.

According to this aspect, the shake control portion is able to swing the image blur correcting unit correspondingly to a camera shake detected by the shake detect portion to thereby correct the camera shake properly.

To solve the first object above, the image pickup apparatus of the invention comprises the image blur correcting device, wherein the image pickup apparatus captures an object image and produces image data in which a blur is reduced by an operation of the image blur correcting device.

Since the image pickup apparatus incorporates the image blur correcting device, even if any blur occurs when an image is picked up using the image pickup apparatus, the blur is reduced by the operation of the image blur correcting unit to thereby be able to provide such image data that represent a clear image.

Also, to attain the first object, a portable equipment of the invention comprises the image pickup apparatus. Further, preferably, the present portable equipment may comprise a casing incorporating the image pickup apparatus therein, wherein a portion of the image blur correcting unit except for the flexible board is disposed at a position near to one of side walls of the inside of the casing, and the portion of the flexible board extending at least first from the sensor board extends, from a side distant from the one of the side walls, further away from the one of the side walls in a direction oblique to both the first and second directions.

When the flexible board for connecting together the holding module and the control portion of the inside of the portable equipment is structured such that it extends from the side distant from the above side wall further away from this side wall in a direction oblique to both the first and second directions, the image blur correcting unit can be disposed at a position near to one of the side walls of the inside of the casing included in the portable equipment, and thus the space efficiency of the inside of the casing can be enhanced.

In attaining the second object, according to the invention, there is provided an image blur correcting unit comprising: a holding module that holds a lens and a sensor board having image sensor, the image sensor receiving object light imaged by the lens to produce an image signal; a support member that swingably supports the holding module in an arbitrary direction at an axis point that is a point on an outer circumference of the holding module; first and second driving mechanisms that drive the holding module respectively via first and second driving points that are separated from the axis point in respective different first and second directions, wherein the first and second driving points are along the outer circumference of the holding module, the first driving mechanism swings the holding module via the first driving point about a first axis connecting the axis point and the second driving point, and the second driving mechanism swings the holding module via the second driving point about the second axis connecting the axis point and the first driving point; and a flexible board in which its one end is connected to the sensor board, the flexible board extending outwardly from the holding module at least one of through a portion of the holding module existing near to the axis point between the axis point and the first driving point and through a portion of the holding module existing near to the axis point between the axis point and the second driving point.

According to the image blur correcting unit of the invention, the flexible board having one end connected to the sensor hoard is extended outwardly from the holding module through the portion of the holding module existing near to the above-mentioned axis point between this axis point and first driving point and/or through the portion of the holding module existing near to the axis point between this axis point and second driving point.

In this structure, the flexible board is pulled out from the vicinity of the axis point where the swinging movement of the holding module while it is swinging is relatively small.

This makes it difficult for the swinging motion of the holding module to be transmitted to the flexible board itself and the connecting portion of the flexible board with respect to the sensor board. Also, after the image blur correcting unit is incorporated into equipment or the like and the flexible board pulled out from the sensor board is connected to a control portion formed in the equipment or the like, the swinging motion of the holding module is difficult to be transmitted to the connecting portion between the flexible board and control portion.

This not only can reduce the deformation of the flexible board itself but also can prevent the flexible board from slipping off the above-mentioned connecting portion. Since, while the holding module is swinging, the load of the flexible board with respect to the holding module can be reduced, the driving force of the driving mechanism to be applied to the holding module can be reduced, which makes it possible to reduce the size of the driving mechanism.

Here, preferably, the portion of the flexible board extending outwardly first from the holding module may spread both between the axis point and first driving point and between the axis point and second driving point and may extend outwardly obliquely to both the first and second directions.

Also, the portion of the flexible board extending outwardly first from the holding module may comprise: a first portion extending outwardly through between the axis point and first driving point; and a second portion extending outwardly through between the axis point and second driving point, and the first and second portions may join together outside the holding module to constitute a single piece of flexible board.

In either structure, the flexible board is pulled out from the vicinity of the axis point where the swinging motion of the holding module is small, which makes it difficult for the swinging motion of the holding module to be transmitted to the flexible board.

When the above-mentioned invention is applied to the patent application 2007-035341 submitted previously by the present applicant, there can be obtained a further better effect.

In other words, preferably, each of the first and second driving mechanisms may comprises: a magnet that forms a magnetic field; and a coil that is placed in the magnetic field and, when energized, produces a force to drive and rotate the holding module.

Also, the holding module may preferably comprise a spherical convex portion at the axis point, and the support member may preferably comprise a spherical convex face that receives the convex portion.

And, the holding module may preferably comprise a spherical convex portion at each of the first and second driving points, the first and second driving mechanisms may preferably comprise spherical concave portions that receive their associated convex portions provided in the first and second driving points, and the first and second driving mechanisms may preferably give a driving force to the convex portions via the concave portions.

Also, preferably, the magnets respectively constituting the first and second driving mechanisms may be fixedly supported by the support member, and the coils respectively constituting the first and second driving mechanisms may be supported by the support member to be movable in an optical axis direction of the lens, and, when energized, may produce a force in the optical axis direction.

Also, the image blur correcting unit may further comprises a cover which covers the holding module, the support member and the first and second driving mechanisms so as to define an outer shape of the image blur correcting unit, the cover having an electromagnetic shield function.

And, in attaining the second object, according to the invention, there is provided an image blur correcting device comprising: the above-mentioned image blur correcting unit; a shake detecting portion that detects a shake; and a shake controlling portion that, in accordance with a detection result of the shake detecting portion, causes the first and second driving mechanisms to swing the holding module.

Also, in attaining the second object, according to the invention, there is provided an image pickup apparatus comprising the above-mentioned image blur correcting device, wherein the image pickup apparatus captures an object image and produces image data in which a blur is reduced by an operation of the image blur correcting device.

Further, in attaining the second object, according to the invention, there is provided portable equipment comprising the above-mentioned image pickup apparatus.

Here, the portable equipment, preferably, may comprise a casing incorporating the image pickup apparatus therein, wherein the portion of the image blur correcting unit except for the flexible board may be a block having a rectangular parallelepiped shape, and this block may be disposed within the casing in such a manner that a side surface thereof spreading parallel to the optical axis of the lens exists in the vicinity of an end face of the casing and extends parallel to the end face.

In this structure, the above image blur correcting unit can be stored into the casing in a compact manner.

Further, the block may preferably be disposed within the casing in such a manner that an opposing corner of the axis point is situated in a corner portions of the casing.

According to this structure, the image blur correcting unit can be stored efficiently in a small space, namely, in the corner portions of the casing and thus the image blur correcting unit can be stored highly densely in the inside of the casing of the portable equipment. As a result of this, the image blur correcting unit does not occupy a large storage space in the inside of the casing, which can provide an effect that a space for incorporating other electronic parts can be increased.

BRIEF DESCRIPTION OF THE DRAWINGS

FIGS. 7A to 7C are views illustrating a manner of drawing out a flexible board 200A from a holding module 20A;

FIGS. 16A to 16C is an explanatory view of an image blur correcting unit shown in FIG. 15;

DETAILED DESCRIPTION OF THE INVENTION

Hereinafter, a preferred embodiment of the image blur correcting unit of the invention, and the image blur correcting device comprising the image blur correcting unit will be described in detail with reference to FIGS. 1 to 9. The below-described embodiment is a specific example of the image blur correcting unit of the invention, and the image blur correcting device comprising the image blur correcting unit. Therefore, various technically preferred limitations are imposed on the embodiment. The scope of the invention is not restricted to the embodiment unless a particular description of limiting the invention is given in the description below.

Figure 1:
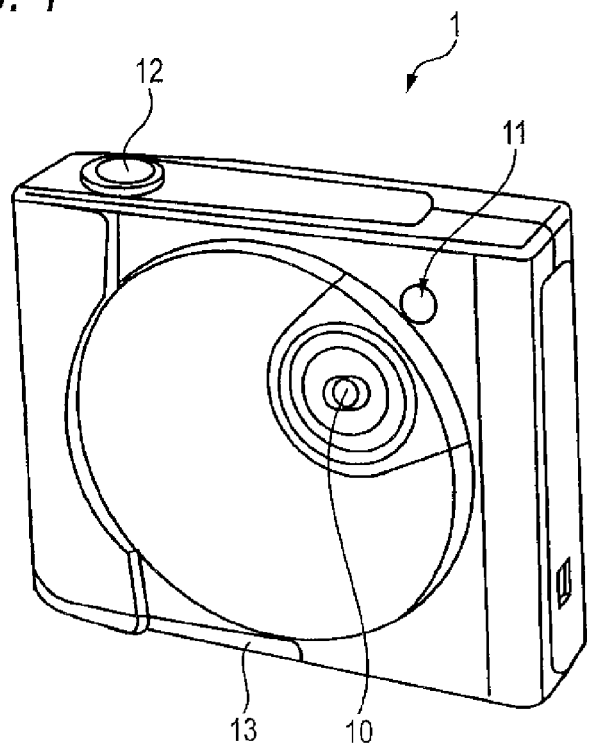
FIG. 1 is an external perspective view of a digital camera in which an embodiment of the image blur correcting unit of the invention is employed, as viewed from the upper oblique side.

FIG. 1 is an external perspective view of a digital camera in which the embodiment of the image blur correcting unit of the invention, and the image blur correcting device comprising the image blur correcting unit is employed, as viewed from the upper oblique side.

The digital camera 1 shown in FIG. 1 is a small auto-focus camera on which an example of the image blur correcting unit of the invention, and the image blur correcting device comprising the image blur correcting unit is mounted. An imaging lens 10 and a viewfinder window 11 are disposed in the front face of the digital camera 1 shown in FIG. 1, and a release switch 12 is disposed in the upper face. In FIG. 1, also a lid 13 for allowing a battery, a recording medium, and the like to be loaded or unloaded is shown in the lower face of the camera.

Figure 2:
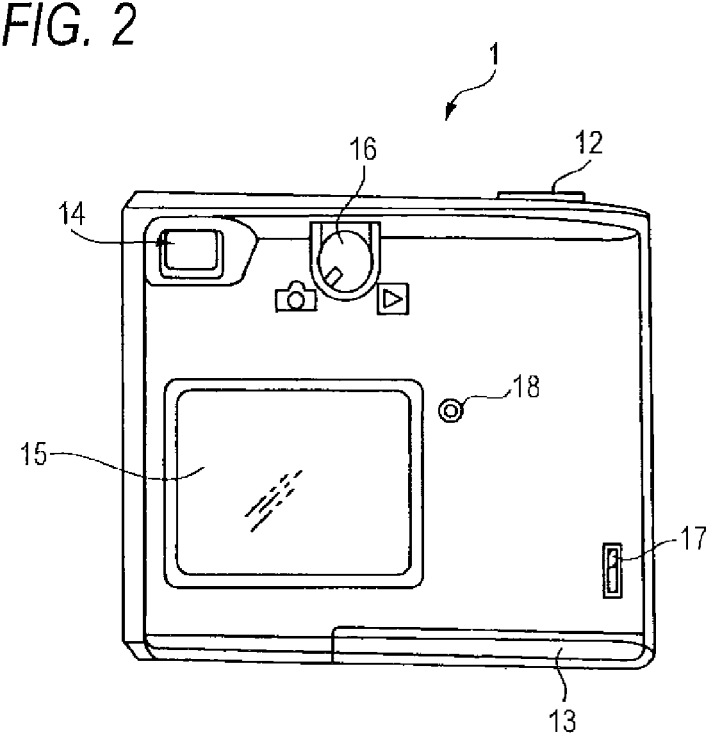
FIG. 2 is a rear view of the digital camera shown in FIG. 1.

FIG. 2 is a rear view of the digital camera shown in FIG. 1.

In the back face of the digital camera 1 shown in FIG. 2, a viewfinder 14, a liquid crystal display screen 15, a mode switch knob 16 which is operated when the mode of the digital camera 1 is switched, and a power source switch 17 are disposed. The digital camera 1 has an imaging mode which is a mode for photographing an object, and a reproducing mode which is a mode for displaying an image recorded in a nonvolatile RAM 305 (see FIG. 3), on the liquid crystal display screen 15.

In FIG. 2, "OK/cancel" button 18 which is operated when it is determined immediately after photographing whether a photographed image displayed on the liquid crystal display screen 15 is recorded into the RAM 305 or not is shown.

Figure 3:
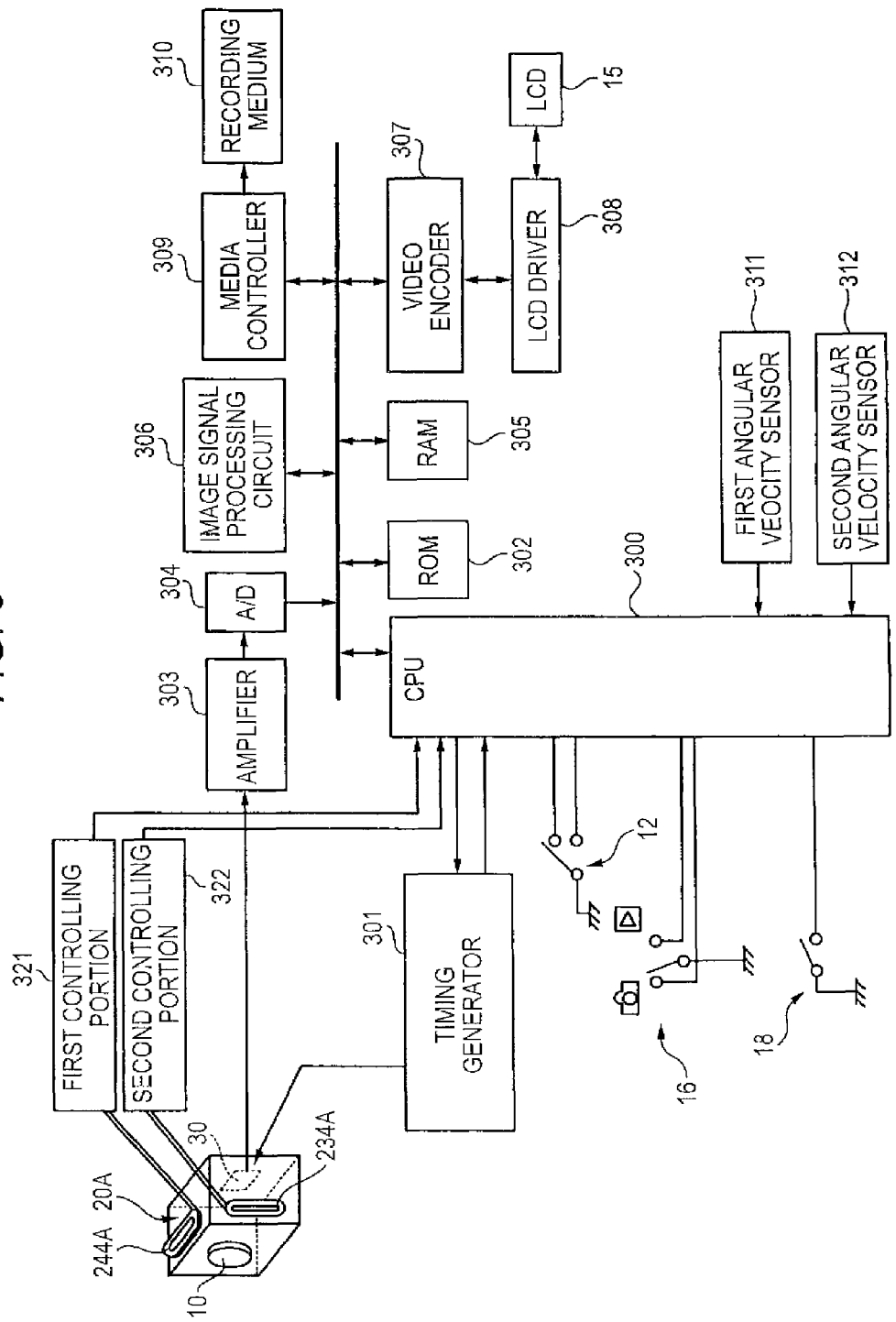
FIG. 3 is a functional block diagram of the digital camera shown in FIGS. 1 and 2.

FIG. 3 is a functional block diagram of the digital camera.

A control program for the digital camera 1 is recorded in a ROM 302 shown in FIG. 3. When the power source switch 17 (see FIG. 1) is turned ON, the control program is activated.

In the digital camera 1, in the case where, when the power source switch 17 is turned ON, the mode switch knob 16 is turned to the side of "camera mark" drawn on the back face of the digital camera 1, i.e., the side of the imaging mode, an object image which is passed through the imaging lens 10 and formed on an image sensor 30 is displayed on the liquid crystal display screen 15. Hereinafter, the operation of the digital camera 1 in the period from the timing when object light enters the interior of the digital camera 1, to that when a through image is displayed on the liquid crystal display screen (hereinafter, the liquid crystal display screen is referred to as LCD) 15 will be described together with the components of the digital camera 1.

The holding module 20A shown in an upper left area of FIG. 3 integrally holds the imaging lens 10 and the image sensor 30. Object light is passed through the imaging lens 10, and then imaged on the image sensor 30. A timing generator 301 which receives instructions from a CPU 300 drives the image sensor 30, whereby an analog image signal corresponding to an object image formed on the image sensor 30 is output from the image sensor 30. The analog image signal output from the image sensor 30 is amplified in an amplifier 303, and then converted to digital image data by an A/D converter 304. The digital image data are once stored into the RAM 305. The digital image data which have been once stored into the RAM 305 are read out from the RAM 305 by an image signal process circuit 306, and subjected to a signal process by the image signal process circuit 306. The digital image data which have been processed are converted to an analog image signal by a video encoder 307, and displayed as an image on the LCD 15 via an LCD driver 308. In the digital camera 1, the case where the mode switch knob 16 is turned to the side of the reproducing mode is not directly related to the invention, and hence its description is omitted.

Next, the imaging operation of the digital camera 1 will be described. The following description is made assuming that the mode switch knob 16 is turned to the side of the imaging mode, and a through image is displayed on the LCD 15.

At the timing when a desired composition is obtained through the viewfinder 14 or the LCD 15, the photographer lightly depresses the release switch 12 and stops the depressing operation halfway (hereafter, the state where the switch is lightly depressed and stopped halfway is referred to as half-depression). When the CPU 300 issues instructions in accordance with this operation, a focusing operation in which the imaging lens 10 is moved in the optical axis direction is performed. Thereafter, the photographer further depresses the release switch 12 in the half-depression state (hereafter, the state where the switch in the half-depression state is further depressed is referred to as full-depression). Then, the photographing operation is performed in the manner described below.

First, at the timing of full-depression, an initializing operation such as discharge of pixels of the image sensor 30 is performed, and then the image sensor 30 is exposed to the object light for a preset time while correcting deviation of the optical axis of the imaging lens 10. When the exposure time has elapsed, the analog image signal is output from the image sensor 30 as described above, and sent to the amplifier 303 to be amplified. Thereafter, the image signal which has been amplified in the amplifier 303 is converted to digital image data by the A/D converter 304, and the converted image signal is once stored into the RAM 305. The image data stored in the RAM 305 are read out, and then supplied to the LCD driver 308. In place of a through image, a photographed image is displayed on the LCD 15. When the "OK/cancel" button 18 is operated in this state to select OK, the photographed image is recorded into a recording medium 310 via a media controller 309. When cancellation is selected, the image data in the RAM 305 are deleted. After these processes are ended, a through image is again displayed on the LCD 15.

Hereinafter, a camera shake correcting device provided in the digital camera 1 will be described in detail.

As shown in FIG. 3, the digital camera 1 comprises a first angular velocity sensor 311 which detects the angular velocity in the so-called pitching direction, and a second angular velocity sensor 312 which detects the angular velocity in the so-called yawing direction perpendicular to the pitching direction. The first and second angular velocity sensors 311, 312 output signals corresponding to angular velocities detected by the sensors, respectively.

In the digital camera 1, during a predetermined time after the timing when the release switch 12 is fully depressed, the CPU 300 determines shake amounts in the pitching and yawing directions, based on the signals respectively output from the first and second angular velocity sensors 311, 312. The method of determining shake amounts by using angular velocity sensors is a known technique, and therefore its description is omitted.

The CPU 300 transmits signals respectively based on the detected shake amounts to first and second controlling portions 321, 322 shown in FIG. 3.

The camera shake correction based on the signals corresponding to the shake amounts is performed by directing the optical axis of the imaging lens 10 held on the holding module 20, i.e., the direction of the holding module 20, toward a direction in which the corresponding shakes are offset.

The direction of the holding module 20 can be controlled by changing the directions and levels of the currents which are supplied from the first and second controlling portions 321, 322 to the first coil 234 that is shown in the upper left area of FIG. 3, and the second coil 244 that is identical in kind with the first coil 234.

Hereinafter, an embodiment of the structure of an image blur correcting unit 2A according to the invention will be described.

Figure 11:
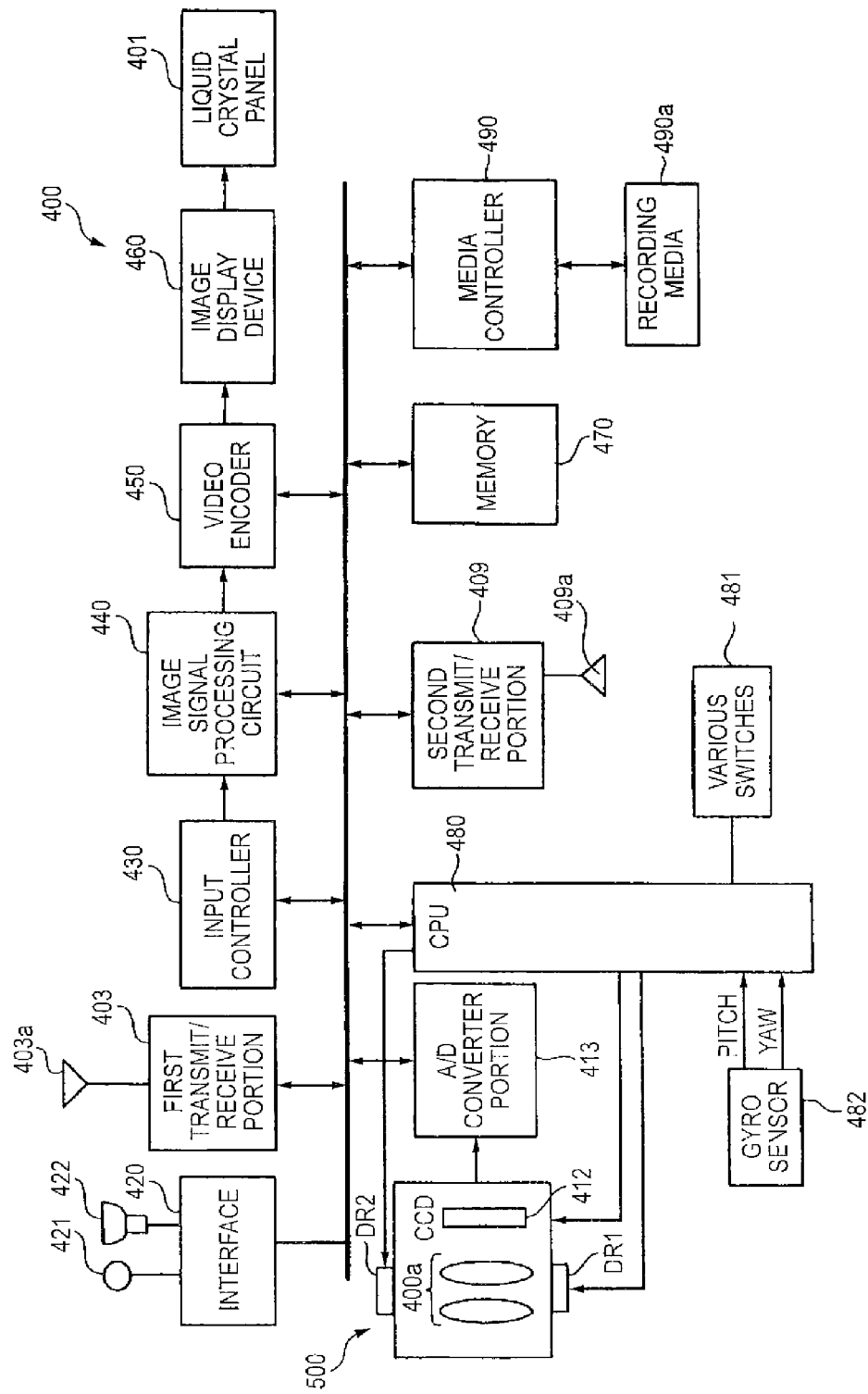
FIG. 11 is an explanatory view of a second embodiment according to the invention.

In the holding module having the structure shown in FIG. 11, the outer frame 21 is disposed so as to surround the holding module 20, and hence the external shape of the outer frame 21 is restricted, so that further miniaturization is disabled. In the embodiment, the outer frame is omitted, and a support member 21A is provided with both the function of the related-art outer frame, and that of the related-art support member, whereby further miniaturization is realized.

Figure 4:
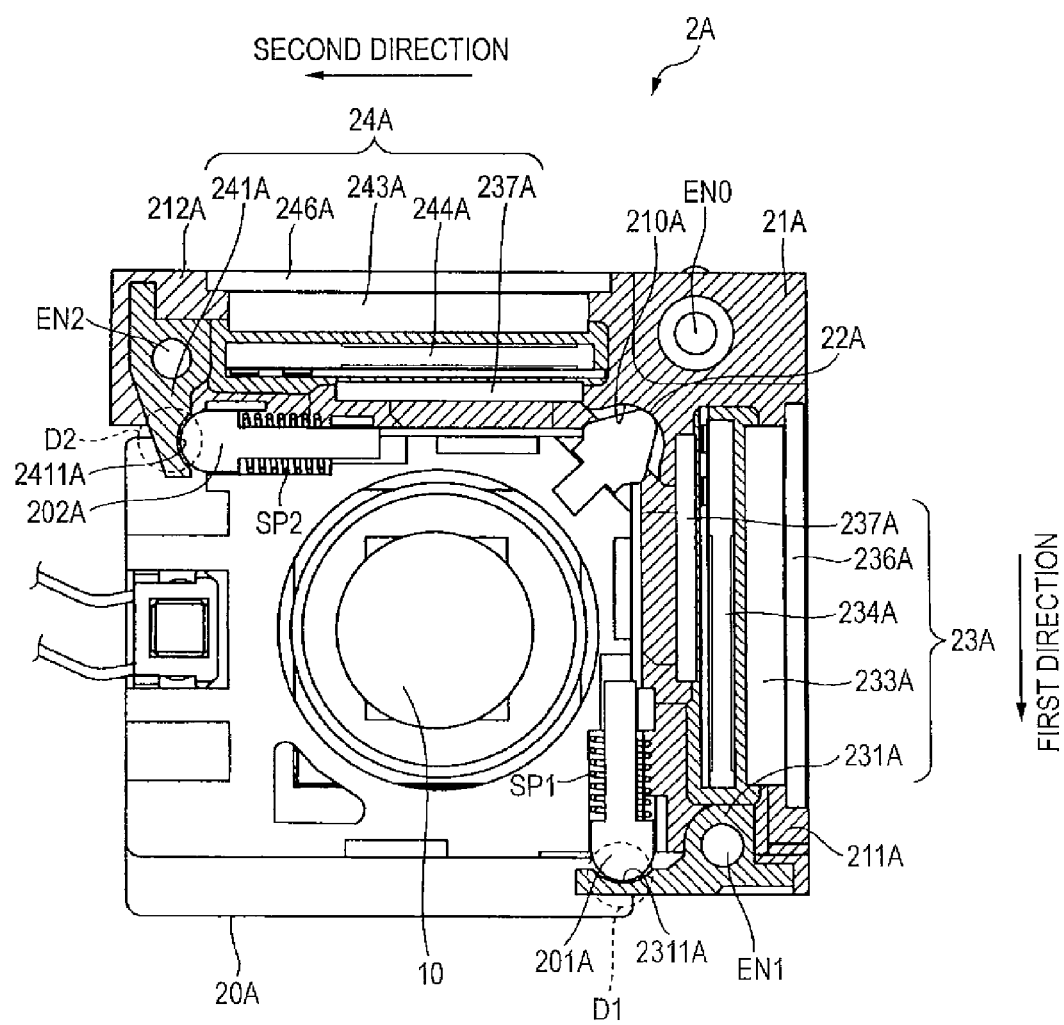
FIG. 4 is a view showing the embodiment of the image blur correcting unit of the invention.
Figure 15:
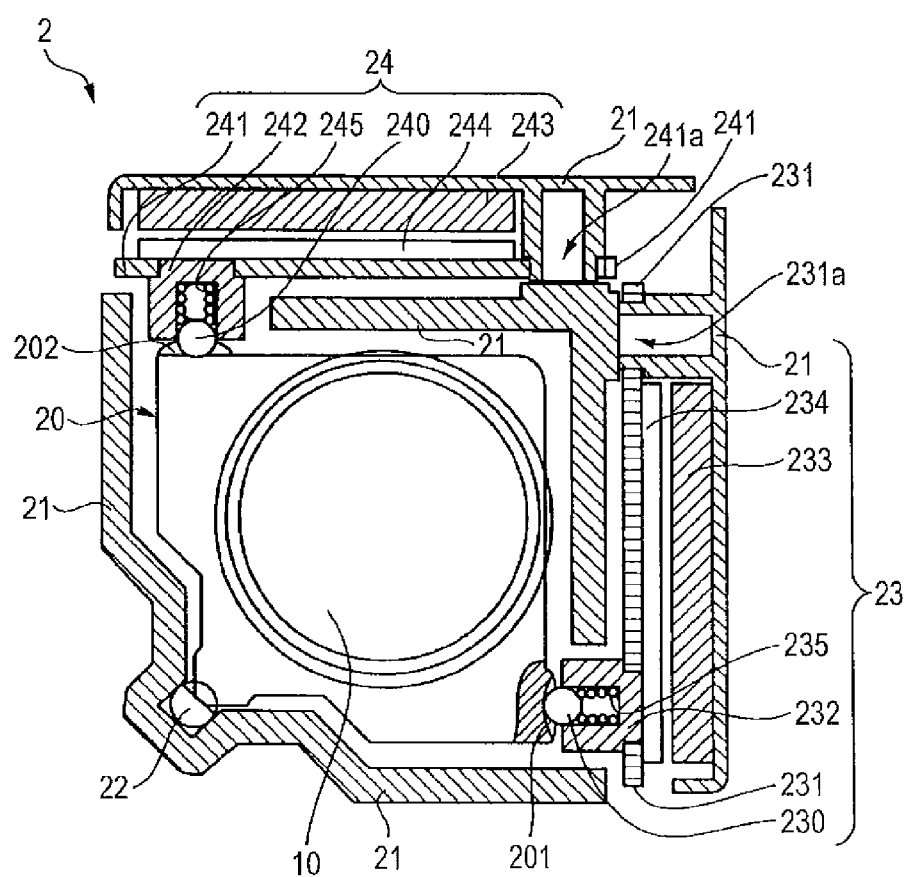
FIG. 15 is a view of an example of the related-art image blur correcting device.

FIG. 4 is a view showing the embodiment of the image blur correcting unit 2A provided in the digital camera 1 shown in FIGS. 1 and 2. In order to allow the comparison with the related-art image blur correcting unit 2 of FIG. 15, members in FIG. 4 having the same function as those of the related-art image blur correcting unit 2 of FIG. 15 are denoted by identical reference numerals as far as possible, and a letter "A" indicating an improved member is affixed to each numeral.

FIG. 4 shows a view of the image blur correcting unit 2A of the embodiment as viewed from the front side. In FIG. 4, shown are components of the image blur correcting unit 2A including: a first driving portion 23A which is placed on the right side face of a holding module 20A to allow the holding module 20A to be swingable in the yawing direction; a second driving portion 24A which is placed on the upper face of the holding module 20A to allow the holding module 20A to be swingable in the pitching direction; an axis point 22A which supports the holding module 20A so as to be swingable in the pitching and yawing directions with respect to the support member 21A; a first driving point D1 which is engaged with a concave portion 2311A of a first arm 231A of the first driving portion 23A via a spherical convex portion 201A disposed in a part of the holding module 20A; and a second driving point Ds which is similarly engaged with a concave portion 2411A of a second arm 241A of the second driving portion 24A via a spherical convex portion 202A. As described above, the holding module 20A in the embodiment holds the lens 10, and the image sensor which captures object light to produce an image signal.

The structure of the image blur correcting unit 2A will be described briefly with reference to FIG. 4.

First, the unit comprises the support member 21A. The support member 21A has a support portion 210A which swingably supports the holding module 20A shown in FIG. 4 in an arbitrary direction at the axis point 22A that is a point on the outer circumference of the holding module 20A. A spherical concave face is disposed in the support portion 210A of the support member 21A. A convex portion formed at the axis point 22A of the holding module 20A is engaged with the concave face.

The support member 21A has first and second wing portions 211A, 212A which elongate in first and second directions from the support portion 210A that is positioned between the portions, and which hold the first and second driving mechanisms 23A, 24A, respectively. In this example, as seen also in FIG. 4, the first and second driving points D1, D2 are formed at positions where a second axis defining the first direction and connecting the first driving point D1 and the axis point 22A, and a first axis connecting the second driving point D2 and the axis point 22A intersect with each other at an angle of about 90 degrees. The portion where the convex portion 201A and concave portion 2311A which constitute the driving points D1 and D2 shown in FIG. 4 contact with each other must support the swing operation of the holding module 20A when the holding module 20A is driven via the driving points D1, D2. Therefore, the portion employs a structure in which the convex portion 201A is elastically pressed against the concave portion 2311A by a compression spring SP1 or SP2.

The configuration of each of the two driving mechanisms 23A, 24A will be described with reference to FIG. 4.

The two driving mechanisms 23A, 24A comprise: magnets 233A, 243A which form a magnetic field, and which are supported by the support member 21A; and coils 234A, 244A which are placed in the magnetic fields, and which, when energized, produce a force for swinging the holding module 20A. The magnets 233A, 243A constituting the first and second driving mechanisms 23A, 24A are fixedly supported by the support member 21A, and the coils 234A, 244A constituting the first and second driving mechanisms 23A, 24A are supported by the support member 21A so as to be movable in the optical axis direction (perpendicular to the plane of the paper) of the lens 10A, so that, when the coils 234A, 244A are energized, a force of the optical axis direction is produced. In the embodiment, as described above, the coils 234A, 244A are attached respectively to the arms 231A, 241A disposed in the first and second wing portions 211A, 212A constituting the support member 21A, and the magnets 233A, 243A are disposed so as to be opposed to the coils 234A, 244A, so that the coils 234A, 244A are movably supported by the support member 21A.

The structure for supporting the coils 234A, 244A which is employed by the driving mechanisms of the embodiment in order to allow the coils 234A, 244A to exert the maximum power will be described. The two driving mechanisms are configured in the same manner. Therefore, the configuration of one of the driving mechanisms, or the driving mechanism 23A will be described.

Figure 5:
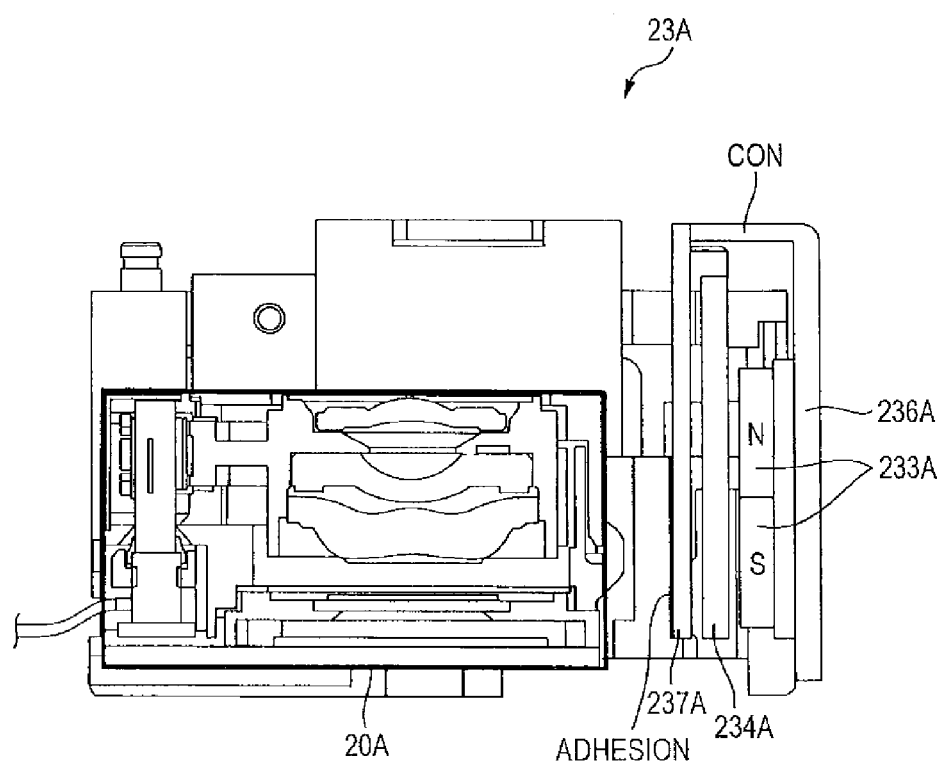
FIG. 5 is a view illustrating the structure for supporting coils 234A, 244A.

FIG. 5 is a view illustrating the structure for supporting the coil 234A.

As shown in FIG. 5, in order to support the coil 234A, a pair of yokes 236A, 237A to one of which the magnet 233A is fixed are disposed. Since the pair of yokes are small, attaching portions are not disposed. The yokes are incorporated while being adhered to the support member 21A by means of an adhesive agent.

The pair of yokes 236A, 237A are configured by a member which has: a pair of parallel plates which extend in parallel on both sides of the magnet 233A and the coil 234A; and a connecting plate CON which couples edges of the pair of parallel plates together, which houses the magnet 233A and the coil 234A, and which has a substantially U-like section shape as a whole. In this example, the pair of yokes 236A, 237A are split into two shapes which are fitted to each other in the vicinity of the connecting plate CON.

Since the pair of yokes 236A, 237A having a split shape are employed, the driving mechanism can be easily assembled in the following manner. One of the paired yokes 236A, 237A, or the yoke 237A is first incorporated by means of the adhesive agent. Then, the magnet 233A and the coil 234A are incorporated. Thereafter, the other yoke 236A is incorporated so as to be fitted into the pair of yokes, thereby assembling the driving mechanism easily.

In the configuration of FIG. 5, after the driving mechanism is assembled, even when the magnetic force due to the magnetic field formed by the magnet 233A and the coil 234A exceeds the bonding strength of the portion where the yoke 237A is bonded to the support member 21A, the yoke is not be inclined because each of the pair of parallel plates is supported by the connecting plate CON.

Referring back to FIG. 4, the components of the driving mechanism other than the yokes 236A, 237A will be described.

Because the coils 234A, 244A are movably supported by the support member 21A, the support member 21A cannot directly support the coils 234A, 244A. As described above, the arms 231A, 241A are disposed in the first and second wing portions 211A, 212A, and the coils 234A, 244A are attached to the arms 231A, 241A, respectively, whereby the two arms 231A, 241A are supported so as to be movable in the optical axis direction.

The two arms 231A, 241A are supported so as to be movable in the optical axis direction, in the following manner. A connecting rod EN0 which elongates in the optical axis direction of the lens 10 is disposed in the vicinity of the support portion 210A of the support member 21A, and connecting rods EN1, EN2 which elongate in the optical axis direction of the lens 10 are disposed in end portions of the first and second wing portions 211A, 212A. Among the three connecting rods EN0, EN1, EN2, the connecting rod EN0 in the vicinity of the support portion supports both the two arms 231A, 241A, and the remaining connecting rods EN1, EN2 support end portions of the two arms 231A, 241A, respectively, whereby the arms 231A, 241A are supported so as to be movable in the optical axis direction together with the coils 234A, 244A attached to the arms 231A, 241A.

Therefore, each of the two driving mechanisms 23A, 24A can swing the holding module 20A via the first driving point D1 about the first axis connecting the axis point 22A and the second driving point D2, and also via the second driving point D2 about the second axis connecting the axis point 22A and the first driving point D1.

When the driving mechanisms are configured as in the embodiment, the first and second driving mechanisms 23A, 24A are collected to the first and second wing portions 211A, 212A of the support member 21A, respectively, and supported thereby. Therefore, the whole has a compactified shape.

Hereinafter, the structures of members constituting the image blur correcting unit 2A will be described with reference to an exploded view of FIG. 6.

Figure 6:
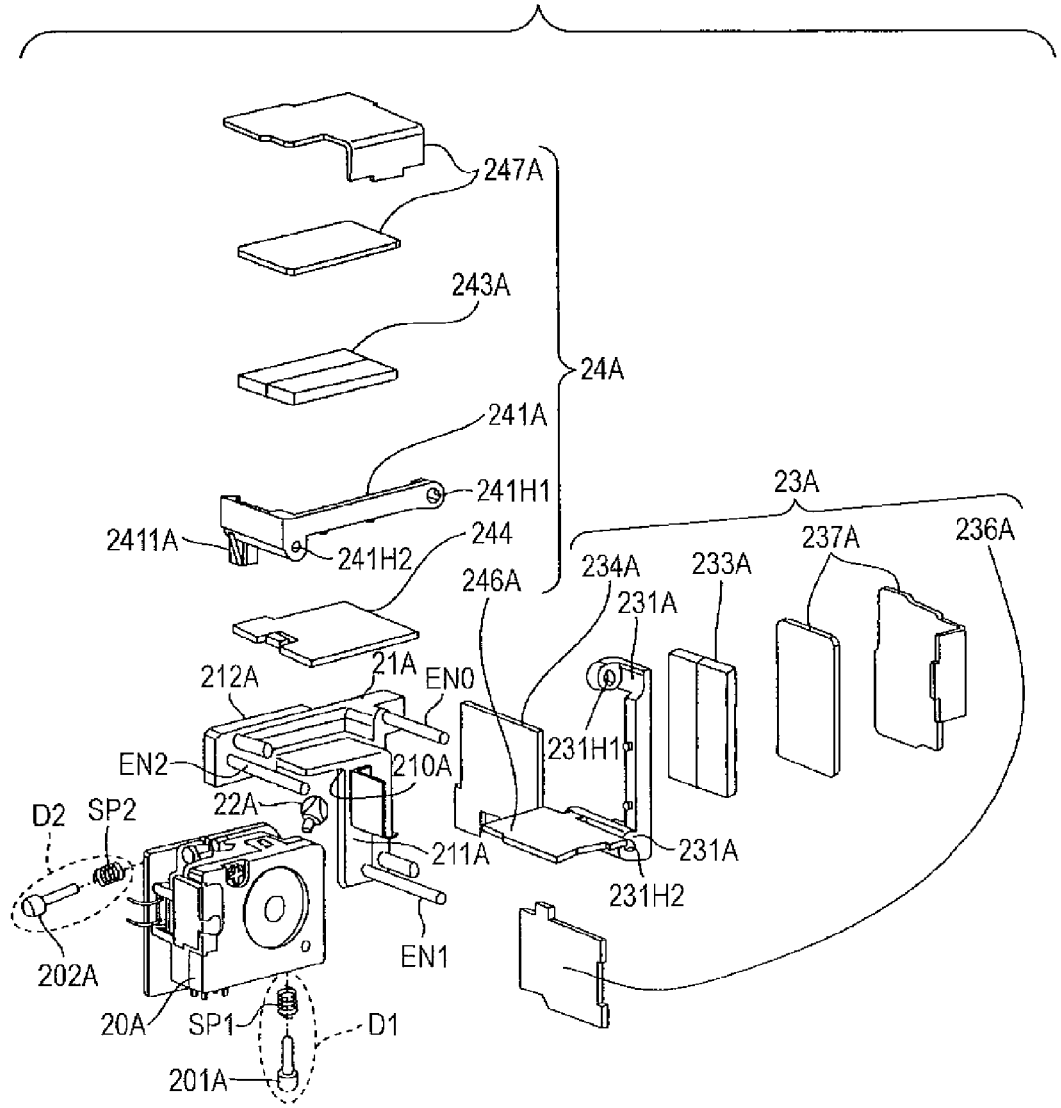
FIG. 6 is an exploded view of the image blur correcting unit of FIG. 4.

FIG. 6 is an exploded view of the image blur correcting unit of FIG. 4.

The holding module 20A comprising the lens and the image sensor is shown in a lower left area of FIG. 6. A spherical convex portion is formed at the axis point 22A that is a point on the outer circumference of the holding module 20A. The spherical convex portions 201A, 202A are disposed respectively in the first and second driving points D1, D2 that are separated from the axis point 22A in different first and second directions, and that are along the outer circumference of the holding module 20A. In order to facilitate the understanding of the shapes of the components, FIG. 6 shows the state where the spherical convex portions 201A, 202A are separated from the holding module 20A. As shown in FIG. 6, actually, both the convex portions 201A, 202A are incorporated in the holding module 20A. In the portions constituting the first and second driving points D1, D2, in order to freely receive the driving forces from the first and second driving mechanisms 23A, 24A while receiving the swing operation of the holding module 20A, to enable the holding module 20A to swing, shafts having the convex portions 201A, 202A at the tip ends are passed respectively through the compression springs SP1, SP2, and then incorporated in the holding module 20A.

The support member 21A which supports the holding module 20A has the support portion 210A, and comprises the first and second wing portions 211A, 212A which elongate in the first and second directions from the support portion 210A that is positioned between the portions, and which hold the first and second driving mechanisms 23A, 24A, respectively. The concave face for receiving the convex face which is the axis point 22A of the holding module 20A is disposed in the support portion 210A. The convex portion 22A of the holding module is engaged with the concave face of the support member 21A, the connecting rod EN0 is passed commonly through holes 231H1, 241H1 disposed in one end portions of the two arms 231A, 241A provided respectively in the first and second driving mechanisms 23A, 24A, and the connecting rods EN1, EN2 are passed respectively through holes 231H2, 241H2 formed in the opposite end portions of the arms 231A, 241A, whereby the holding module 20A is swingably supported with respect to the support member 21A as shown in FIG. 4. In the opposite end portions of the two arms 231A, 241A, the concave portions 2311A, 2411A which are to be coupled to the convex portions of the driving points D1, D2 of the holding module 20A are disposed, respectively, in addition to the holes 231H2, 241H2 through which the connecting rods EN1, EN2 are to be passed. When the convex portions 201A, 202A of the holding module are engaged respectively with the concave portions 2311A, 2411A to configure the driving points D1, D2, therefore, operations of driving the holding module 20 via the driving points D1, D2 can be independently performed. As a result, the holding module 20 can be swung about the axis point 22A.

Namely, in the state where the coils 234A, 244A are attached respectively to the two arms 231A, 241A and the concave portions 2311A, 2411A of the two arms 231A, 241A are coupled respectively to the convex portions 201A, 202A of the holding module 20A, the two arms 231A, 241A are caused to move in the optical axis direction by energization of the coils 234A, 244A, whereby the holding module 20A is swung about the axis point 22A.

In this example, in the case where the arms 231A is moved in the optical axis direction together with a coil board 234A provided in the image blur correcting unit 2A by the interaction between the magnetic field formed by energization of the coil board 234A, and that formed by the magnet 233A, if the position of the coil board 234A is not known, the controlling portions of the digital camera shown in FIGS. 1 and 2 cannot control against a camera shake even when the image blur correcting unit 2A is incorporated in the digital camera. Therefore, a Hall element 2341A for position detection is placed on the coil board 234A so that the attitude of the holding module 20A can be correctly controlled.

In the image blur correcting unit 2A shown in FIG. 4, in the case such as that the digital camera shown in FIGS. 1 and 2 is dropped, it is necessary to prevent the holding module 20A from being disengaged from the support member 21A as a result that, in the driving points D1, D2, the engagements between the convex portions and concave portions are cancelled. If not, the image blur correcting unit does not operate, and the camera shake correction cannot be performed.

Depending on the manner of drawing out a flexible board 200A from a sensor board 201A provided in the holding module 20A, a stress may be applied to the flexible board 200A by the swing operation of the holding module 20A. Therefore, it is necessary also to prevent the flexible board from being disengaged from the sensor board 201A by such a stress. If not, even when an electric signal is supplied from the controlling portions to the correcting unit, the signal is not transmitted the image blur correcting unit, and the operation of the image blur correcting unit is disabled.

In the image blur correcting unit 2A shown in FIG. 4, therefore, the manner of drawing out the flexible board 200A is improved, and a structure in which movement restricting members 202A, 203A are added to prevent the holding module 20A from dropping off from the support member 21A is employed.

Figure 8:
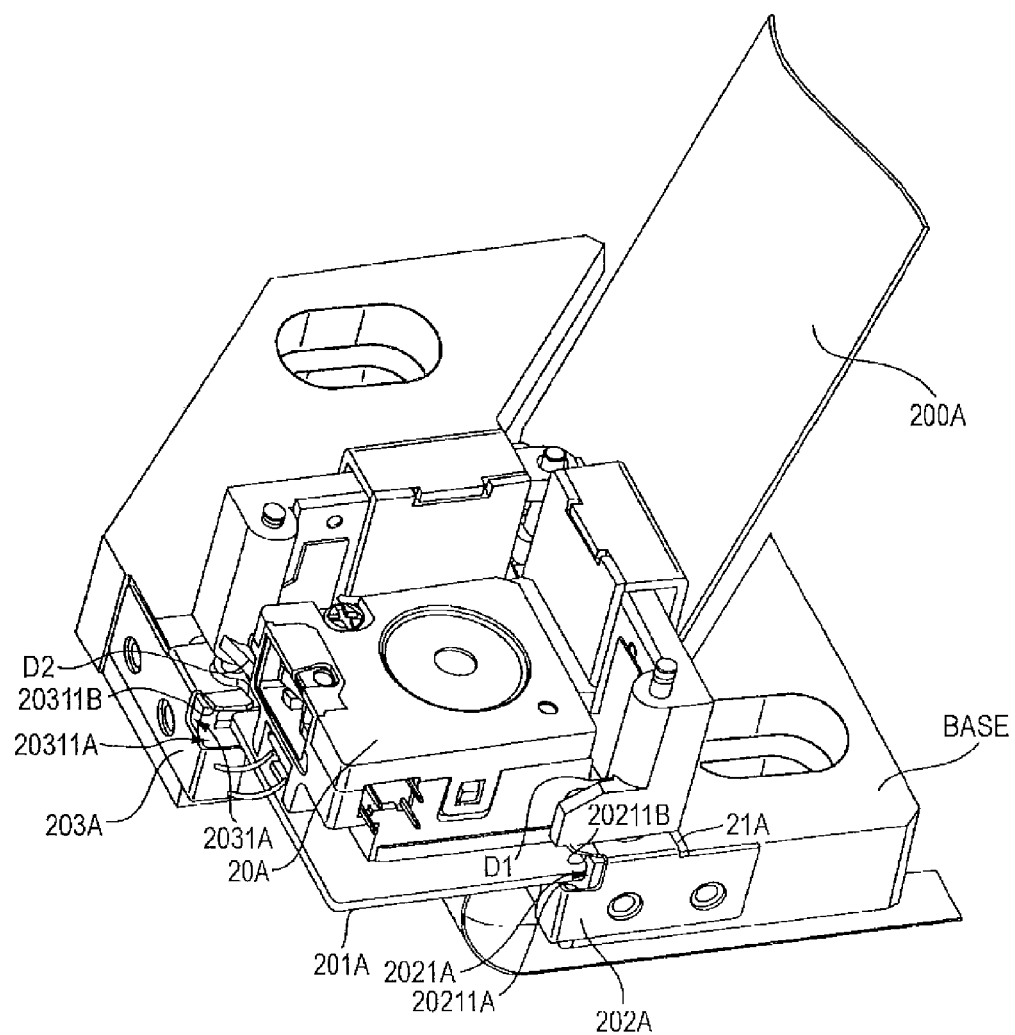
FIG. 8 is a perspective view showing a state where a support member 21A provided in an image blur correcting unit 2A having the configuration of FIGS. 7A to 7C is fixed to a support portion BASE of a portable apparatus, as viewed from an obliquely upper front side.

FIGS. 7A to 7C are views illustrating a manner of drawing out the flexible board 200A from the holding module 20A. FIG. 8 is a perspective view showing a state where the support member 21A provided in the image blur correcting unit 2A having the configuration of FIGS. 7A to 7C is fixed to a support portion BASE of a portable apparatus, as viewed from an obliquely upper front side.

FIG. 7A is a view of the image blur correcting unit 2A, as viewed from an upper front side, FIG. 7B is a view of the image blur correcting unit 2A, as viewed from a lateral side, and FIG. 7C shows a state where the holding module 20A has not yet been incorporated in the support member 21A.

First, improvements of the manner of drawing out the flexible board 200A will be described.

The spherical convex portion formed at the axis point 22A of the holding module 20A shown in FIG. 7C is contacted and engaged with the concave face formed in the support portion of the support member 21A, thereby forming the shape of FIG. 7A.

In the holding module 20A shown in FIG. 7A, as described above, the sensor board 201A is placed, and the flexible board 200A is drawn out from the sensor board 201A. FIG. 7B shows a state where the flexible board 200A has not yet been connected to a connecting portion of the sensor board 201A which is on the back face side of the holding module 20A.

As shown in FIG. 7C, one end of the flexible board 200A is connected to the flexible board 200A, and the portion that elongates at least first from the sensor board 201A elongates from the holding module 20A toward the outside, in a direction oblique to both the first and second directions.

The first and second driving points D1, D2 are formed at positions where the second axis connecting the first driving point D1 and the axis point, and the first axis connecting the second driving point D2 and the axis point 22A intersect with each other at an angle of about 90 degrees. In the flexible board 200A, the portion that first elongates from the sensor board elongates from the holding module 20A toward the outside, in a direction which forms an angle of about 45 degrees with respect to both the first and second directions.

According to the configuration, the flexible board 200A can be obliquely drawn out from the vicinity of the axis point 22A where a shake is produced in the least degree. Even when the holding module 20A swings, therefore, a stress applied to the flexible board 200A is reduced, and the trouble that the connecting portion connected to the sensor board 201A is disengaged hardly occurs. Also a portion connected to a controlling portion of the portable apparatus into which the image blur correcting unit is incorporated is hardly disconnected.

The image blur correcting unit 2A shown in FIG. 7A is incorporated into the interior of the digital camera shown in FIGS. 1 and 2, and, as shown in FIG. 8, the support member 21A is fixed to the support portion BASE of a portable apparatus such as the digital camera. In the fixation, in order to prevent the image blur correcting unit 2A from being disengaged from the support member 21A and the support portion BASE when the digital camera is dropped, the movement restricting members 202A, 203A comprising cutaway portions 2021A, 2031A shown in FIG. 8 are fastened by screws to the support member 21A and the side face of the support portion BASE.

In this example, as shown in FIG. 8, the cutaway portions 2021A, 2031A of the movement restricting members 202A, 203A restrict the movement range of the holding module 20A in the optical axis direction to the range where the engagements between the convex portions provided in the first and second driving points D1, D2 and the concave portions for receiving the convex portions are maintained.

When the holding module 20A almost drops toward the lower side of FIG. 8, for example, the movement of the holding module 20A is restricted by the lower faces 20211A, 20311A of the cutaway portions 2021A, 2031A of the movement restricting members 202A, 203A, and therefore the holding module 20 is prevented from being disengaged from the support member 21A and the support portion BASE. Conversely, when the holding module 20A is almost disengaged toward the upper side of FIG. 8, the movement of the holding module 20A is restricted by the upper faces 20211B, 20311B of the cutaway portions 2021A, 2031A of the movement restricting members 202A, 203A, and therefore the holding module 20 is prevented from being disengaged from the support member 21A and the support portion BASE.

Namely, even when a digital camera of FIGS. 1 and 2 in which the image blur correcting unit of FIG. 8 is incorporated is dropped, the engagements between the convex portions and concave portions of the driving points D1, D2 are maintained by the cutaway portions 2021A, 2031A of the movement restricting members 202A, 203A, thereby preventing the holding module 20A from being disengaged from the support member 21A and the support portion BASE. Therefore, the photographer picks up the digital camera which has been dropped, and can immediately perform the photographing operation with using the digital camera while performing the camera shake correction.

Finally, the swinging operation of the image blur correcting unit in the yawing and pitching directions will be described.

Figure 9A:
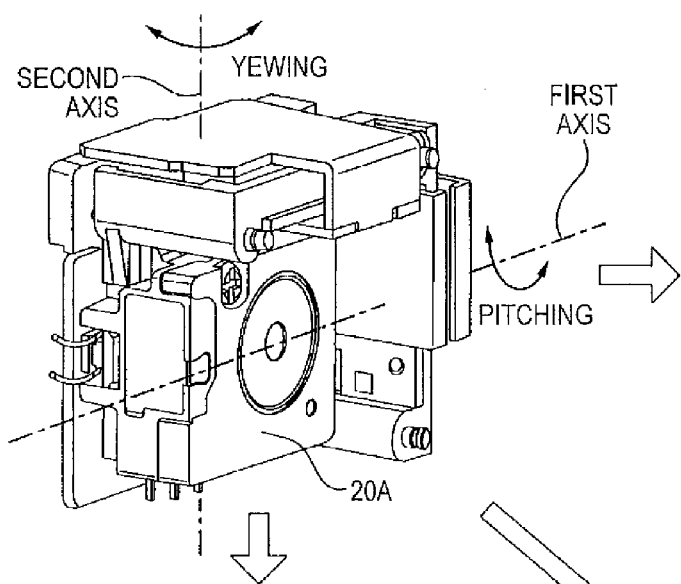
FIGS. 9A to 9D are views illustrating the operation of the image blur correcting unit 2A.
Figure 9C:
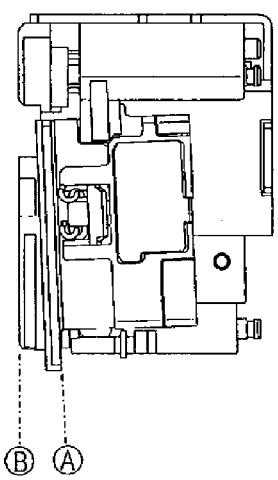
Figure 9B:
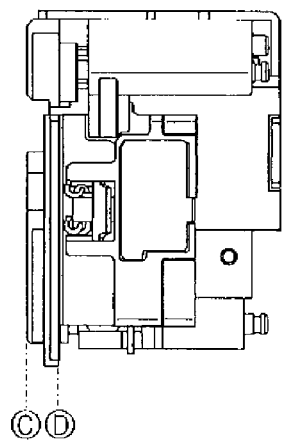

FIGS. 9A to 9C are views illustrating the operation of the image blur correcting unit.

Figure 9D:
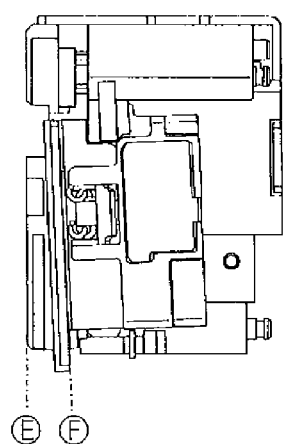

FIG. 9A is a perspective view of the image blur correcting unit, as viewed from an obliquely upper front side, FIG. 9B is a view of the holding module 20A which is driven by the second driving mechanism 24A in the yawing direction, as viewed from the left lateral side of the perspective view of FIG. 9A, FIG. 9C is a view of the holding module 20A which is driven by the first driving mechanism 23A in the pitching direction, as viewed from the left lateral side of the perspective view of FIG. 9A, and FIG. 9D is a view of the holding module 20A which is driven by the first and second driving mechanisms 23A, 24A in the yawing and pitching directions, as viewed from the left lateral side of the perspective view of FIG. 9A.

As shown in FIG. 9A, the holding module 20A is swingably supported by the first and second driving mechanisms 23A, 24A which are supported by the support member 21A.

When both the first and second driving mechanisms 23A, 24A do not drive the holding module, for example, an edge A of the support member 21A supporting the holding module 20A, and an edge B of the sensor board 201A are substantially parallel to each other.

When the holding module 20A is driven by the first driving mechanism 23A, the holding module 20A is swung and inclined in the yawing direction as shown in FIG. 9C. When this state is viewed from the left lateral side of FIG. 9A, an inclination occurs between an edge A of the holding module 20A and an edge B of the support member 21A.

When the holding module 20A is driven by the second driving mechanism 24A, the holding module 20A is inclined in the yawing direction. When this state is viewed from the left lateral side of FIG. 9A, the distance between an edge C (perpendicular to the edge A) of the holding module 20A and an edge D (perpendicular to the edge B) of the support member 21A is increased while the edges are maintained substantially parallel to each other as shown in FIG. 9B.

When the holding module 20A is driven simultaneously by both the first and second driving mechanisms 23A, 24A, the holding module 20A is swung about the first axis as shown in FIG. 9D, and also about the second axis to be inclined with respect to both the first and second axes as shown in FIG. 9A. In FIG. 9D, the state cannot be suitably shown, and hence the same state as that of inclination toward the pitching direction is shown by occurrence of inclination between an edge E of the support member and an edge F of the holding module.

According to the image blur correcting unit 2A, namely, the holding module 20A is driven by each of the first and second driving mechanisms 23A, 24A, whereby the holding module 20A can have any posture.

In the case where the thus configured image blur correcting unit is placed in an image pickup apparatus or the like, even when a camera shake occurs in any manner, the holding module is driven so as to cancel the camera shake, and the camera shake is corrected, with the result that a clear image which is free from a blur is obtained.

Finally, an example of the case where the image blur correcting unit of the embodiment is applied to a camera-equipped portable telephone will be described.

Now, FIGS. 10~14 are respectively explanatory views of a second embodiment according to the invention.

Figure 10A:
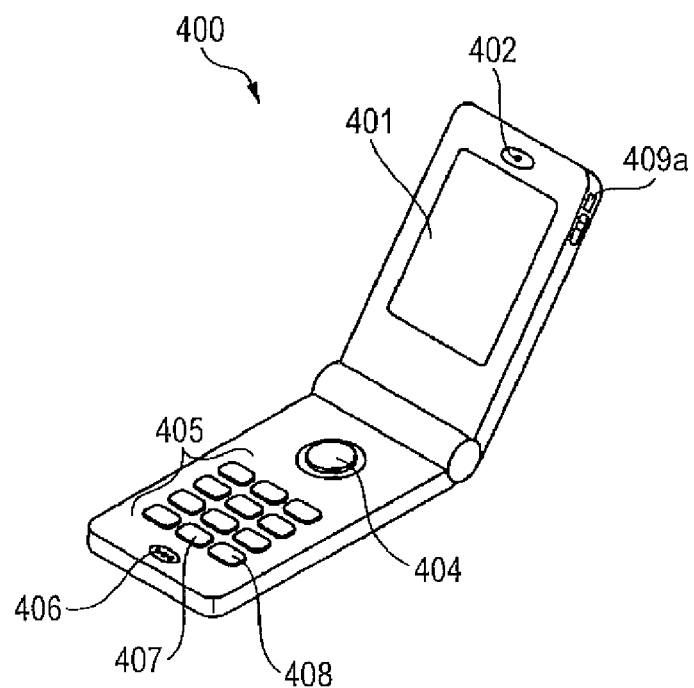
FIGS. 10A and 10B are explanatory views of a second embodiment according to the invention.
Figure 10B:
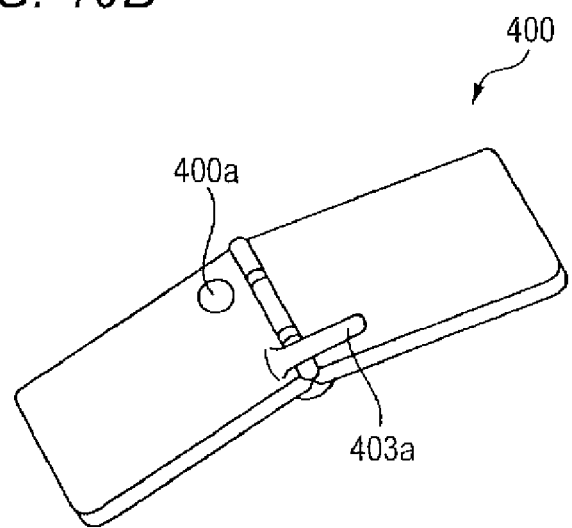

FIGS. 10A and 10B are external perspective views of a cellular phone which is an embodiment of portable equipment according to the invention.

FIG. 10A shows the front view of a cellular phone 400. The cellular phone 400 includes on the front surface thereof: a liquid crystal panel 401 on which a menu screen, a picked-up image or the like can be displayed; an ear piece 402 which incorporates a speaker (see FIG. 11) therein and is used to send out a sound emitted from the speaker into space; a select button 404 which can be used as a shutter button when selecting various functions or picking up an image; a push button 405 for inputting telephone number; a mouthpiece 406 which incorporates a microphone (see FIG. 11) therein and is used to transmit a voice to the microphone; a determination button 407 for determining telephone number or the like input by a user; a power button 408; and, a second antenna 409a used to transmit and receive an image, address information or the like through radio communication for a short range not through a telephone station.

FIG. 10B shows a back view of the cellular phone 400. On the back surface of the cellular phone 400, there are provided: a first antenna 403a for transmitting and receiving data such as a sound or a mail through the telephone station; and, an imaging lens 400a. This imaging lens 400 is held by an image blur correcting unit which will be discussed later.

Also, FIG. 11 is a block view of the internal structure of the cellular phone 400 shown in FIGS. 10A and 10B.

Specifically, the cellular phone 400 includes in the interior thereof: an image blur correcting unit 500; an A/D (Analog/Digital) converter portion 413; a microphone 421, a speaker 422, an interface portion 420; a first antenna 403a; a first transmit/receive portion 403; an input controller 430; an image signal processing portion 440; a video encoder 450; an image display device 460; a second antenna 40a; a second transmit/receive portion 409; a memory 470; a CPU 480; a media controller 490; and, various switches 481 such as the select button 404 and push button 405 respectively shown in FIGS. 10A and 10B. Further, there is connected a record media 490a to the interior of the cellular phone 400. In the present embodiment, the image blur correcting unit 500, CPU 480, gyro sensor 482, and drivers DR1, DR2 cooperate together in constituting an example of an image blur correcting device according to the invention; and, the present image correcting device cooperates together with the input controller 430, image signal processing portion 440, video encoder 450, image display device 460, liquid crystal panel 401, media controller 490, and recording media 490a in constituting an example of an image pickup apparatus according to the invention.

The CPU 480 transmits an instruction for a processing to the various composing elements of the cellular phone 400 shown in FIG. 11 to control the various composing elements. For example, in a state where an image pickup mode for execution of an image pickup operation is set, when the select button 404 shown in FIGS. 10A and 10B is depressed, the CPU 480 not only gives an instruction to a CCD 412 included in the image blur correcting unit 500 but also gives such an instruction to the drivers DR1, DR2 as to swing a holding module (which will be discussed later) in the image blur correcting unit 500 in a direction to cancel a camera shake detected by the gyro sensor 482, whereby an image is picked up while the camera shake is corrected. The structure of the image blur correcting unit 500 will be discussed later in detail.

When the select button 404 shown in FIG. 10A is depressed, the CPU 480 sets an electronic shutter in the CCD included in the image blur correcting unit 500, and starts an image pickup processing.

At the then time, the direction of the camera shake when the select button 404 is depressed is detected by the gyro sensor 482 and is notified to the CPU 480. On receiving the detect result of the gyro sensor 482, the CPU 480 notifies the drivers DR1, DR2 of a correcting direction and allows the drivers DR1, DR2 to drive a coil (which will be discussed later) provided in the image blur correcting unit 500, whereby the CPU 480 can carry out the image pickup operation while swinging a holding module (which will be discussed later) provided in the image blur correcting unit 500 according to the camera shake. Thus, the camera shake caused when the select button 404 is depressed can be corrected and thus the image of the light of an object can be formed on the CCD 412 with no blur.

And, the CCD 412 receives the object light having passed through the image pickup lens 400a during the shutter second time of an electronic shutter and reads an object image based on the object light as an object signal which is an analog signal. The object signal generated by the CCD 412 is converted to digital picked-up image data by the A/D converter portion 413. The thus converted pickup image data is transmitted through the input controller 430 to the image signal processing portion 440.

The image signal processing portion 440 carries out an image processing on the image data such as RGB level adjustment and gamma adjustment, and enforces a compressing processing on the image data after image processed. The image data after compressed is transmitted to a memory 470 once.

The memory 470 includes: an SDRAM which stores therein programs to be executed in the cellular phone 400, is used as an intermediate buffer, and has a high recording speed; an SRAM which functions as a data holding memory for storing data for various menu screens, user's set contents and the like; and, a VRAM for storing compressed image data. The VRAM is divided into two or more areas, the image data are stored sequentially into the two or more areas, and the stored image data are read out sequentially into the video encoder 150 or media controller 490.

The video encoder 450, in accordance with an instruction given from the CPU 480, acquires the compressed image data from the memory 470 and converts the compressed image data to the data format that can be displayed on a liquid crystal panel 401. The thus converted image data are transmitted to the image display device 460, while images represented by the image data are displayed on the liquid crystal panel 401 by the image display device 460. The media controller 490 is used to record the compressed image data stored in the memory 470 into the recording media 490a and is also used to read out the image data recorded in the recording media 490a.

Also, when telephone number is input using the push buttons 405 shown in FIG. 10A and the determination button 407 is depressed, the telephone number is set and communication with a partner device is started. At the then time, communication information such as the telephone number of the cellular phone 400 and the input telephone number is transmitted from the CPU 480 to the first transmit/receive portion 403; the communication information is converted to waves and the thus obtained waves are then transmitted to the antenna 403a; and, the waves are then issued from the antenna 403a. The waves issued from the first antenna 403a are transmitted to a telephone station through community antennas (not shown) provided on various portions such as buildings or utility poles, and, in the telephone station, there is set up connection with a piece of partner equipment to which the specified telephone number is allocated.

When connection with partner equipment is set up, sounds issued toward the cellular phone 400 by a user are collected by the microphone 421, the thus collected sounds are converted to waves representing sound data by the interface portion 420, and the waves are then transmitted to the partner equipment by the first antenna 403a of the first transmit/receive portion 403. Also, waves for sound received through the first antenna 403a are converted to sound data by the interface portion 420, and the sound data are then issued as sounds from the speaker 422. In the first transmit/receive portion 403 and first antenna 403a, there are transmitted and received not only the sound data but also mail data representing mails using mail addresses instead of the telephone number. The mail data, which has been received by the first antenna 403a and has been converted to digital data by the first transmit/receive portion 403, are stored into the memory 470 by the input controller 430.

Also, the cellular phone 400 includes not only a communication interface (first transmit/receive portion 403, first antenna 403a) for communication with partner equipment such as another cellular phone through a telephone station but also a radio communication interface (second transmit/receive portion 409, second antenna 409a) for communication using radio communication for a short distance not through the telephone station. As the communication interface for short distance communication, there can be used infrared communication, Bluetooth, or the like. In the present embodiment, as a communication interface, there is applied infrared communication. Specifically, when the second antenna 409a receives infrared rays which are transmitted directly from another cellular phone or the like, an electric signal based on the thus received infrared rays is picked up by the second transmit/receive portion 409 and is converted to digital data.

On the other hand, when transmitting data to external equipment from the cellular phone 400, the data are transmitted to the second transmit/receive portion 409, the data are converted to waves by the second transmit/receive portion 409, and the waves are then issued from the second antenna 409a.

When the second antenna 409a receives infrared rays representing an image, the second transmit/receive portion 409 converts an electric signal based on the infrared rays to image data. The thus converted image data, similarly to the picked-up image data, are transmitted to the image display device 460, where an image represented by the image data can be displayed on the liquid crystal panel 401 or can be recorded into the recording media 490 through the media controller 490.

The cellular phone 400 is basically structured in the above-mentioned manner.

Next, description will be given below in detail of the structure of the image blur correcting unit 500 which constitutes part of the image pickup apparatus included in the cellular phone 400.

Figure 12:
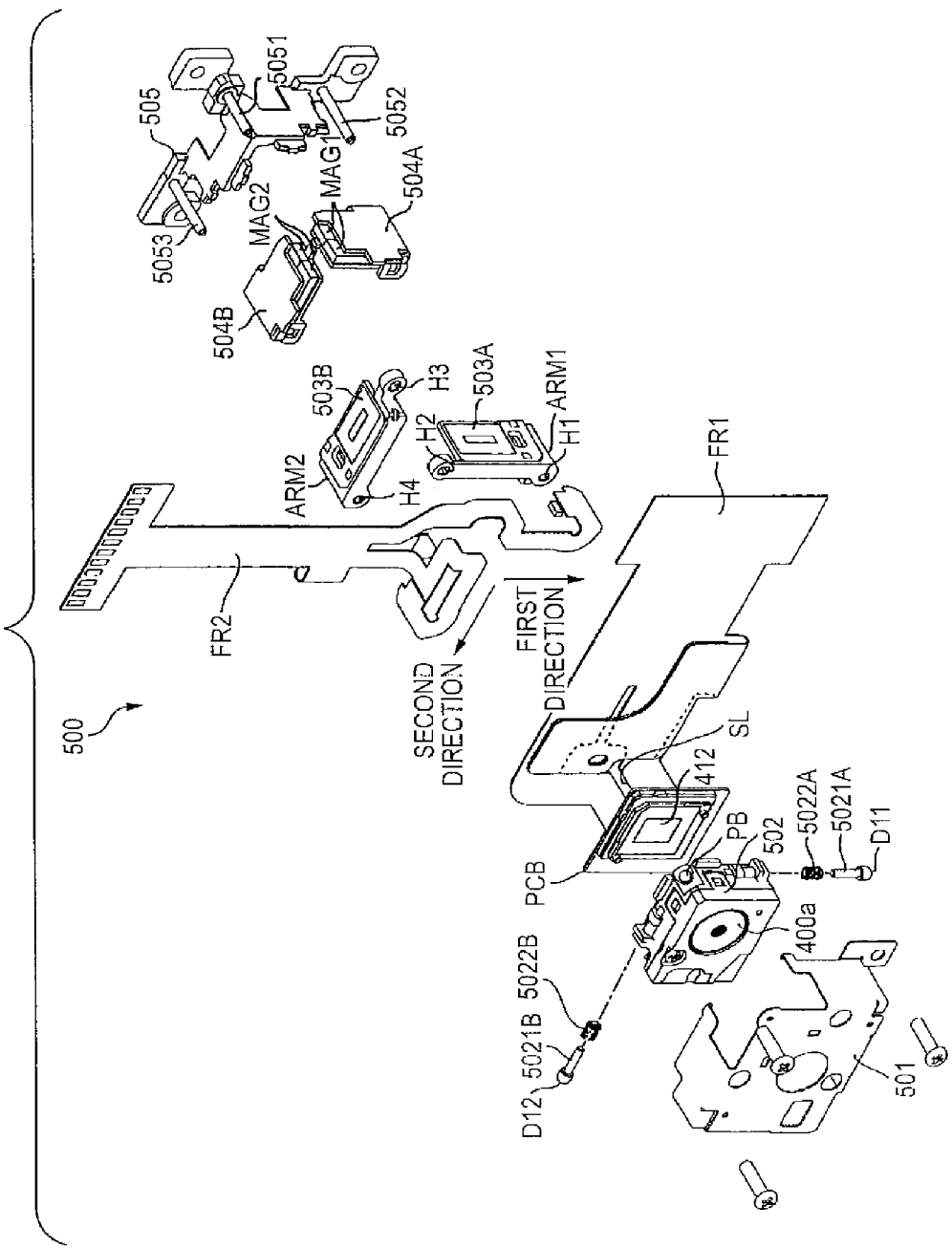
FIG. 12 is an explanatory view of a second embodiment according to the invention.
Figure 13:
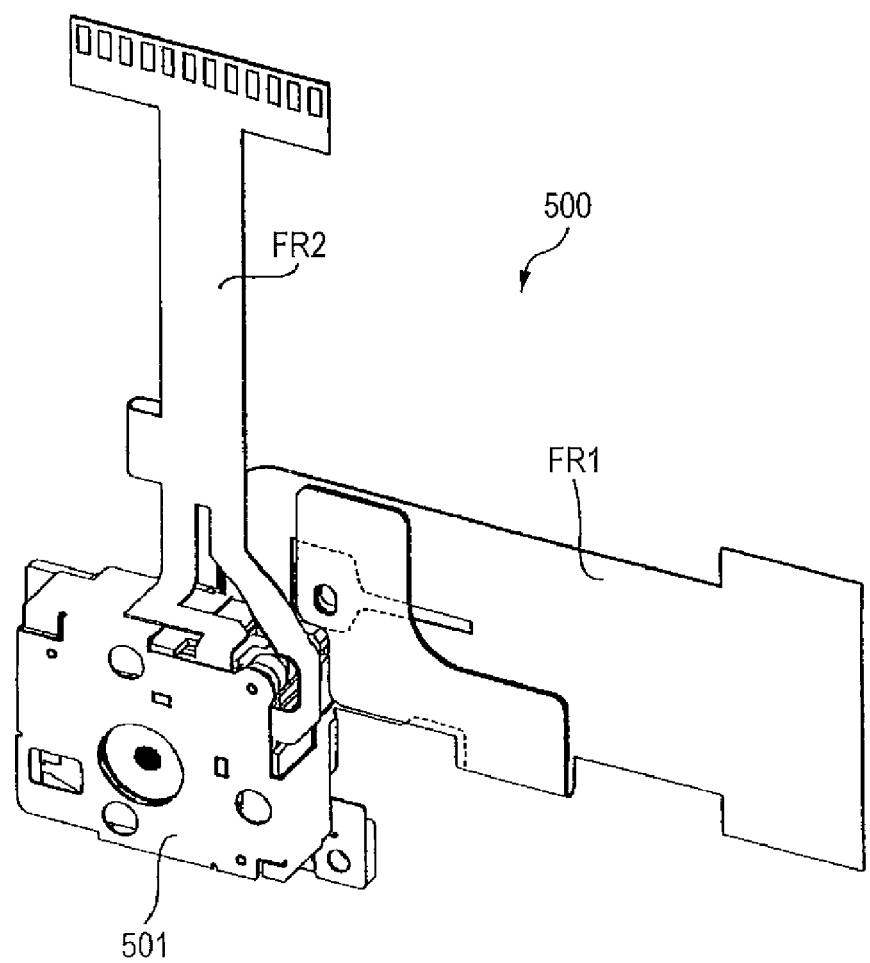
FIG. 13 is an explanatory view of a second embodiment according to the invention.

FIG. 12 shows an exploded perspective view of an image blur correcting unit 500 incorporated in the interior of a casing of the cellular phone shown in FIGS. 10A and 10B, and FIG. 13 is an explanatory view of the image blur correcting unit 500, showing a state thereof after the respective composing elements thereof shown in the exploded perspective view of FIG. 12 are incorporated therein.

In FIGS. 12 and 13, the left lower side thereof provides the side where an object exists.

In FIG. 12, from the left lower object side thereof, there are sequentially shown the following composing elements in an exploded manner: that is, a cover 501; a holding module 502; a flexible board FR1 for image signal transfer; a flexible board FR2 for electrically energizing coils respectively provided on both a board 503A extending in a first direction in FIG. 12 and a board 503B extending in a second direction in FIG. 12; a pair of arms ARM1 and ARM2 for holding the boards 503A and 503B respectively; two U-shaped yokes 504A and 504B respectively for holding their associated magnets MAG1 and MAG2 the N and S poles of which are so arranged as to face the coils provided on the boards 503A and 503B; and a support member 505 which supports two arms respectively in a rotatable manner, while the two yokes 504A and 504B are fixed to the surfaces of the support member 505 that respectively extend in the first and second directions. By the way, on the surface of the cover 201 shown in FIGS. 12 and 13, there is formed a metal film by deposition or similar treatment in order for the cover 201 to be able to have a shield function. When these composing elements are assembled together, there is provided a shape which is shown in FIG. 13.

Firstly, description will be given below of the structure of the image blur correcting unit with reference to FIG. 12.

On the right-most side of FIG. 12, there is shown the dogleg-shaped support member 505 for supporting the two driving mechanisms that are used to swing the holding module 502. Specifically, not only the two driving mechanisms for swinging the holding module are supported by the support member 505 but also the holding module is swingably supported by the support member 505.

The support member 505 includes, in the three positions thereof, three guide members 5051, 5052 and 5053 to be inserted into hole portions H1, H2, H3 and H4 which are respectively formed in the two end portions of the two arms ARM1 and ARM2. These guide members 5051~5053 are respectively disposed in the respective apexes of the support member 505 having a dogleg shape; and, with the guide member 5051 that is situated in the central position, there can be engaged in common the hole portions H1 and H3 of the four hole portions formed in the two end portions of both arms ARM1 and ARM2.

That is, of the two arms, one arm ARM1 is engaged with not only the guide member 5051 disposed in the apex of the center of the dogleg shape of the support member 505 but also the guide member 5052 disposed in the apex of the one end portion of the dogleg shape, whereas the other arm ARM2 is engaged with not only the guide member 5051 disposed in the apex of the center of the dogleg shape of the support member 505 but also the guide member 5053 disposed in the apex of the other end portion of the dogleg shape. By the way, although not shown, on the holding module sides of respective one end portion sides (where the hole portions H2 and H4 are present) of the two arms ARM1 and ARM2, there are respectively formed concave portions which can be engaged with spherical-shaped convex portions which are formed on the holding module.

Also, to the surfaces of the support member 505 which respectively extend in the first and second directions with the apexes of the support member 505 as the centers thereof, there can be bonded and fixed U-shaped yokes 5041 and 5042 respectively. Since the U-shaped yokes 504A and 504B are disposed such that their respective openings face the side where the boards 503A and 503B with coils provided thereon are disposed, the boards 503A and 503B can be stored from their associated openings sides of the yokes in such a manner that they are arranged parallel to magnets MAG1 and MAG2. To the respective boards 503A and 503B, there can be connected the flexible board FR2 which is used to electrically energize the coils provided on the boards 503A and 503B. The boards 503A and 503B with the coils provided thereon respectively include hall elements used to detect the position of the holding module 502 which can be swung according to the movements of the arms ARM1 and ARM2.

As described above, on the holding module 502 sides of the apex portions of the dogleg-shaped support member 505, there are formed the concave portions with which the spherical-shaped convex portions PB of the holding module 502 can be engaged; and, therefore, when the respective members are assembled together in such a manner that not only the convex portions PB of the holding module are respectively engaged with the concave portions of the support member 505 but also the spherical-shaped convex portions of the two arms ARM1, ARM2 movably supported on the support member 505 are engaged with the convex portions of the first and second driving points D11 and D12 of the holding module 502, as shown in FIG. 13, the holding module can be swingably supported by the support member.

In this example, the support member 505, arm ARM1, board 503A with a coil provided thereon, and yoke 504A with the magnet MAG1 bonded thereto cooperate together in constituting an example of a first driving mechanism according to the invention; and, the support member 505, arm ARM2, board 503B with a coil provided thereon, and yoke 504B with the magnet MAG1 bonded thereto cooperate together in constituting an example of a second driving mechanism according to the invention.

In FIG. 12, for demonstration of the first and second driving points D1 and D2, there are shown rod-shaped members 5021A, 5021B each including a spherical-shaped convex portion and springs 5022A, 5022B which are respectively to be mounted on their associated rod-shaped members 5021. The springs 5022A, 5022B respectively have the functions to prevent their associated arms ARM1, ARM2 against movement when the coils are not energized. Specifically, they have the functions that, when the coils are not energized, they can press the convex portions (first driving point D1 and second driving point D2) against their associated concave portions formed in the arms due to the energizing forces of the springs, whereby, after the coils are deenergized, the springs can retain the arms at positions where they were present at the time of the deenergization of the coils.

Also, in this example, similarly to the first embodiment, there is shown a structure in which not only the lens but also the CCD 412 are held by the holding module 502; and, therefore, to the holding module 502 which can be swung, there is connected the flexible board FR1 for image signal transfer. Referring to the connection of the flexible board FR1 specifically, one end of the flexible board FR1 is connected to the sensor board PCB on which the CCD 412 is mounted; and, the portion of the flexible board FR1 that extends at least first from the sensor board PCB is connected in such a manner that it extends outwardly from the holding module 402 in a direction oblique both to a first direction connecting an axis point PB and first driving point D11 and to a second direction connecting the axis point PB and second driving point D12. Further, as shown in FIG. 12, in the portion of the flexible board FR1 that extends at least first from the sensor board PCB in the above oblique direction, there is formed a slit SL which extends in the above oblique direction. According to this structure, not only vibrations can be made difficult to be transmitted to the flexible board FR1 but also, when the swinging movement of the holding module 502 starts to be transmitted to the flexible board FR1, the stress of the flexible board FR1 can be eased due to the slit SL of the flexible board FR1.

Further, in the cellular phone according to the present embodiment, by disposing the image blur correcting unit at a position near to the side wall of the cellular phone shown in FIGS. 10A and 10B, the space efficiency of the inside of the casing of the cellular phone is enhanced, whereby the image blur correcting unit is skillfully incorporated into a small free space of a casing having a compact and small-thickness structure.

Figure 14:
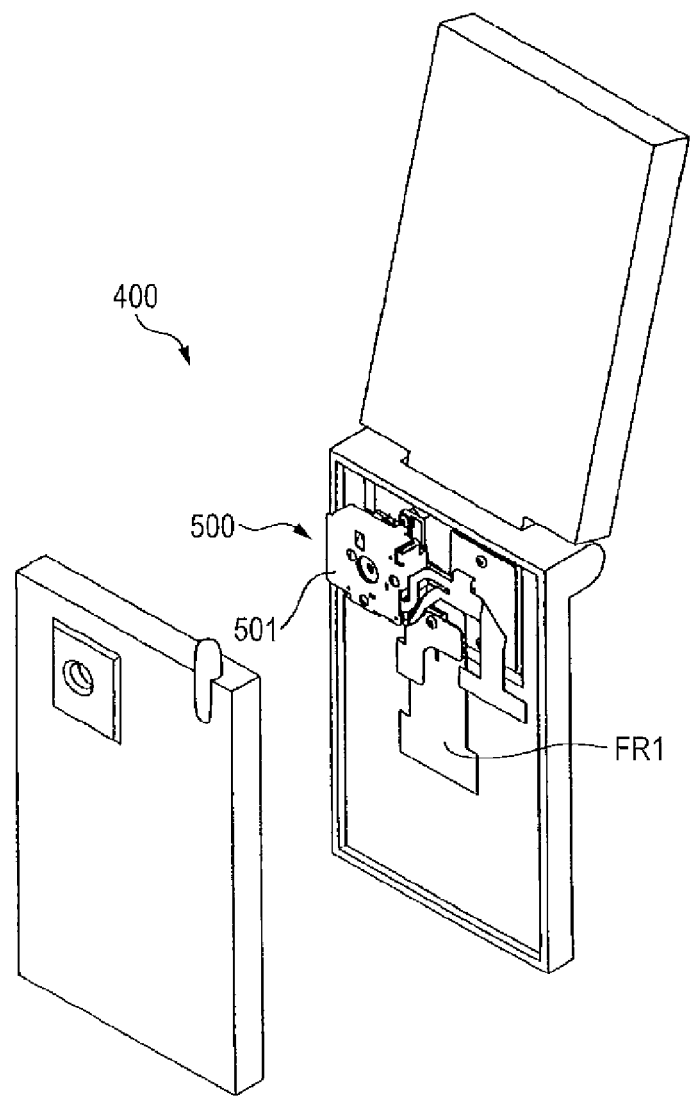
FIG. 14 is a view to show the arrangement of an image blur correcting unit in the inside of a casing of a cellular phone 400 shown in FIGS. 10A and 10B.

FIG. 14 shows how an image blur correcting unit is disposed in the inside of the casing of the cellular phone 400 shown in FIGS. 10A and 10B.

FIG. 14 shows a state in which, when incorporating the image blur correcting unit 500 into the inside of the cellular phone shown in FIGS. 10A and 10B, the image blur correcting unit 500 is incorporated at a position near to the side wall of the casing of the cellular phone 400.

As shown in FIG. 14, the image blur correcting unit 500 is incorporated in good order into the cellular phone 400 in such a manner that the holding module of the image blur correcting unit 500 is disposed at a position near to one of the side walls of the inside of the casing of the cellular phone 400 as well as the portion of the flexible board FR1 extending at least first from the sensor board extends from the side distant from the above casing side wall further away from this side wall in a direction oblique to both the first and second directions. When the image blur correcting unit 500 is incorporated in good order into the corner portion of the casing of the cellular phone 400, the image blur correcting unit can be incorporated into a small free space of the corner portion of the casing with high efficiency.

Specifically, the portion of the image blur correcting unit 200 except for the flexible board according to the invention is a block having a rectangular parallelepiped shape; the casing of the cellular phone 100 is a casing the vertical direction dimension of which is longer than the right and left direction dimension thereof; and, the block is disposed at a position near to one of the right and left side walls of the inside of the casing in a direction where the right and left direction dimension thereof is longer than the vertical direction thereof.

Further, in the present embodiment, the cover is allowed to have an electromagnetic shield function (for example, the cover is made of a material having a shield function, or metal is formed on the surface of the cover using evaporation or similar technology), whereby the image blur correcting unit can be incorporated in the vicinity of an antenna which functions as an electricity and magnetism buffer part.

Thus, the image blur correcting unit according to the invention can be effectively applied to a cellular phone including a casing which is small in size and in thickness.

As described above, an image blur correcting unit in which a stress applied to a flexible board connected to a sensor board and drawn out to the external is reduced, an image blur correcting device comprising the image blur correcting unit, an image pickup apparatus comprising the image blur correcting device and a portable equipment having the image pickup apparatus are realized.

Also, in attaining the second object of the invention, according to the second embodiment, an improvement is made over the manner of extraction of the flexible substrate FR1 from the holding module 502. Description will be given below of a structure for realizing such improvement.

As shown in FIG. 12, to the holding module 502, there is connected the flexible board FR1 for image signal transfer. While one end of the flexible board FR1 is connected to a sensor board PCB on which a CCD 412 is mounted, the flexible board FR1 extends outwardly from the holding module 502 not only through the portion of the holding module 502 existing between the axis point PB and first driving point D11, specifically, the portion existing near to the axis point PB but also through the portion of the holding module 502 existing near to the axis point PB between the axis point PB and second driving point D12.

This means that the middle point of a line intersecting a line connecting the axis point and first driving point exists nearer to the axis point than the middle point of the line connecting the axis point and first driving point, that is, the flexible board exists nearer to the axis point than the middle point of the line connecting the axis point and first driving point. That is, preferably, the flexible board may exist nearer to the axis point than the middle point of the line connecting the axis point and first driving point. This applies similarly also to the flexible board that passes near to the axis point between the axis point and second driving point.

Also, preferably, the portion of the flexible board FR1 extending outwardly first from the holding module 502 according to the invention may spread not only between the axis point PB and first driving point D11 but also between the axis point PB and second driving point D12 as well as may extend outwardly in a direction oblique to both the first and second directions.

According to the above structure, the swinging motion of the holding module 502 is not transmitted to the flexible board FR1 so much, which makes it difficult for the flexible board FR1 not only to be deformed but also to be removed from the connecting portion.

By the way, according to the above embodiment, the portion of the flexible board FR1 extending outwardly first from the holding module 502 according to the invention spreads not only between the axis point PB and first driving point D11 but also between the axis point PB and second driving point D12. However, such portion may also spread between the axis point PB and first driving point D11 or between the axis point PB and second driving point D12.

Figure 17A:
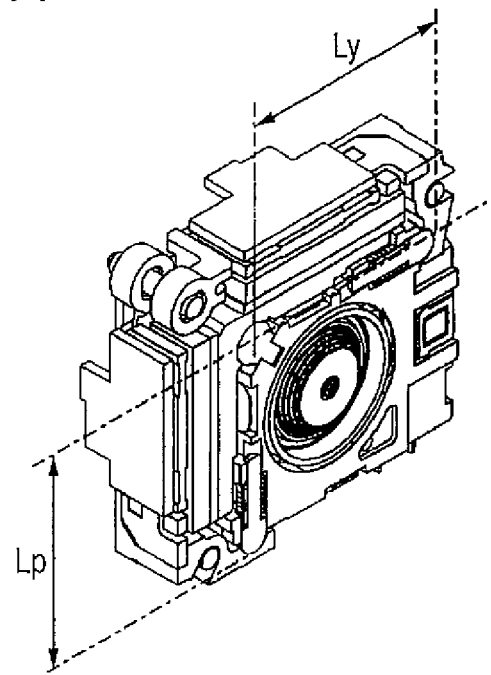
FIGS. 17A and 17B are explanatory views of the relationship between the vertical and longitudinal lengths of a holding module.
Figure 17B:
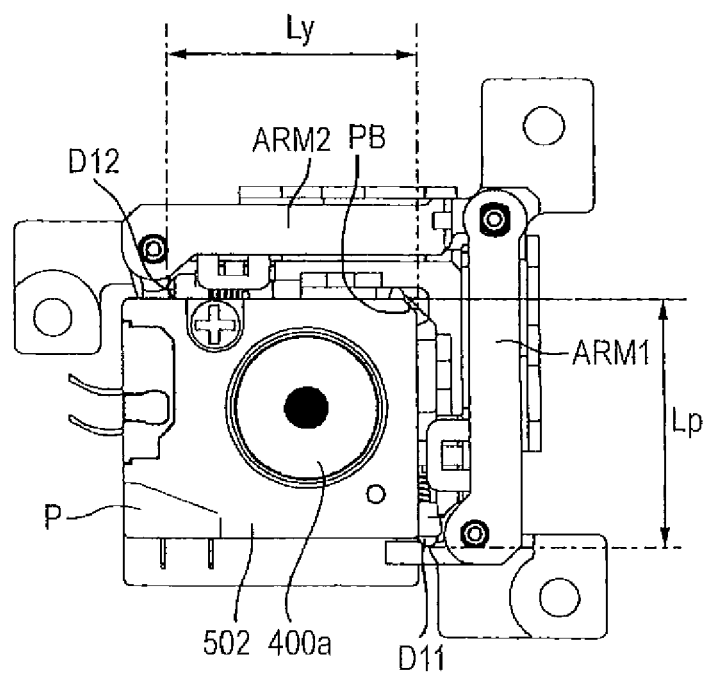

In addition to the above improvement over the manner of extraction of the flexible board, according to the present embodiment, in view of the fact that, in a camera-equipped cellular phone, a camera shake in the pitching direction is large, as shown in FIGS. 17A and 17B which will be discussed later, the length Lp of the image blur correcting unit in the pitching direction is set shorter than the length Ly thereof in the second drive shaft direction, whereby the portion of the image blur correcting unit except for the flexible board provides a block having a rectangular parallelepiped shape.

Figure 18A:
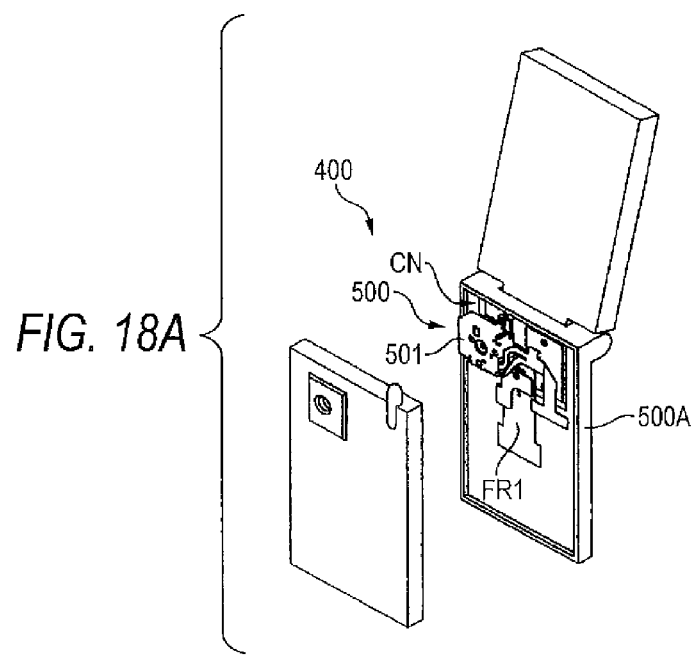
FIGS. 18A and 18B are explanatory views of a state in which an image blur correcting unit is mounted into the corner portion of a cellular phone while it is arranged long sideways.
Figure 18B:
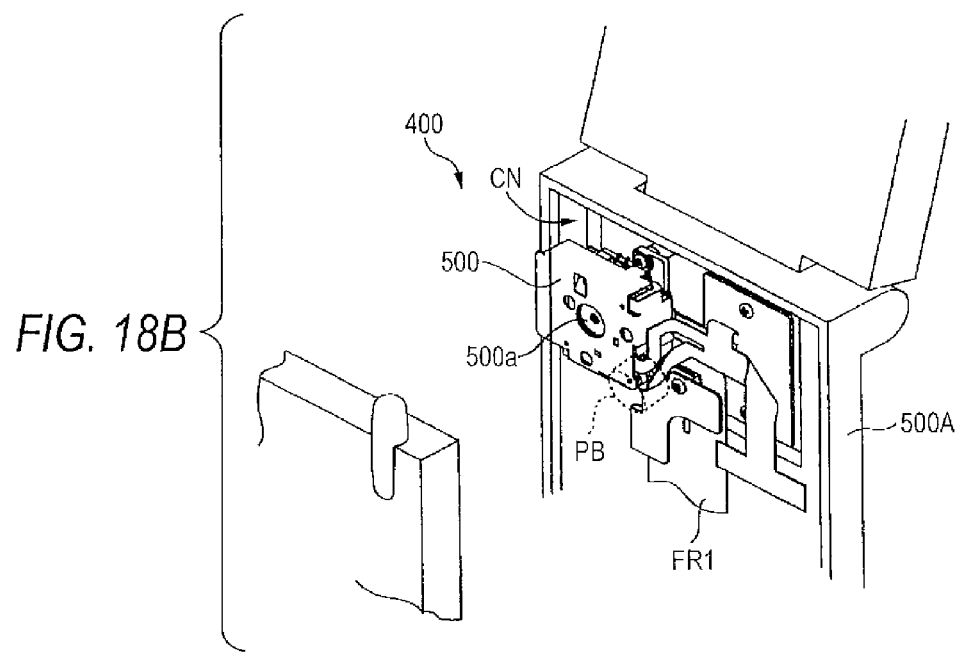

In this case, as shown in FIGS. 18A and 18B, while the rectangular parallelepiped-shaped block is disposed long sideways in such a manner that the opposing corner of the axis point PB are situated in the corner portion CN of the casing 500A, the image blur correcting unit 500 can be built highly densely into the small space, specifically, the corner portion CN of the casing 500A of the cellular phone 400.

FIGS. 17A and 17B are explanatory views of the relationship between the vertical and transverse lengths (the vertical direction corresponds to the pitching direction and the transverse direction corresponds to the yawing direction) of the portion of the image blur correcting unit 500 except for the flexible board FR1.

FIG. 17A shows the portion of the image blur correcting unit 500 except for the flexible board FR1 when it is viewed from obliquely above, while FIG. 17B shows the same when viewed from above.

In FIGS. 17A and 17B, the shape of the block of the portion of the image blur correcting unit 500 except for the flexible board FR1 (see FIGS. 12 and 13) is formed as a rectangular parallelepiped shape and is arranged long sideways (Ly>Lp), whereby not only a first driving mechanism (which includes the first arm ARM1) is able to rotate the holding module 502 through the first driving point D11 around a first axis connecting the axis point PB and second driving point D12 (that is, in the pitching direction) within a first maximum angle (in this embodiment, ±1.5 degrees) but also a second driving mechanism (which includes the second arm ARM2) is able to rotate the holding module 502 through the second driving point D12 around a second axis connecting the axis point PB and first driving point D11 within a second maximum angle (which, in this embodiment, is smaller than the above-mentioned first maximum angle of ±1.5 degrees).

In this manner, by improving the shape of the portion of the image blur correcting unit 500 except for the flexible board FR1 and the manner of extraction of the flexible board FR1, the image blur correcting unit can be incorporated into a cellular phone more compactly than ever.

FIGS. 18A and 18B are views to show a state in which the image blur correcting unit 500 shown in FIGS. 17A and 17B is incorporated efficiently into the casing of a cellular phone which has been reduced in size and thickness over the related-art one.

Specifically, FIG. 15A is a view of the inside of the cellular phone 400 with the lower portion of the casing 500A removed therefrom, and FIG. 18B is an enlarged view of the peripheral portion of the cellular phone where the image blur correcting unit 500 is mounted.

As shown in FIGS. 18A and 18B, the image blur correcting unit 500 is skillfully incorporated into the corner portion CN of the cellular phone 400.

As described above, thanks to the improvements on the shape of the portion of the image blur correcting unit 500 except for the flexible board FR1 and the manner of extraction of the flexible board FR1, the image blur correcting unit 500 can be built highly densely into a smaller space than the related-art one in the corner portion CN of the casing of the cellular phone 400.

That is, the cellular phone 400, which is an example of the portable equipment of the invention, includes the casing 500A incorporating an image pickup apparatus therein, the portion of the image blur correcting unit 500 except for the flexible board FRY is formed as a block having a rectangular parallelepiped shape, and this block is disposed within the casing 500A in such a manner that the side surface thereof spreading parallel to the optical axis of a lens 400a is arranged adjacent to and parallel to the end face of the casing 500A.

Also, according to the invention, the casing 500A has a vertically long shape and the portion of the image blur correcting unit 500 except for the flexible board FR1, that is, the above-mentioned block is disposed within the casing 500A in such a manner that the longitudinal direction of the block extends along the end face of the casing 500A extending in the short side direction thereof.

Further, the portion of the image blur correcting unit 500 except for the flexible board FR1, that is, the block is disposed within the casing 500A in such a manner that the opposing corner of the axis point PB are situated in the corner portion CN of the casing 500A.

According to this structure, the image blur correcting unit can be stored into the inside of the cellular phone more compactly than ever.

Figure 19:
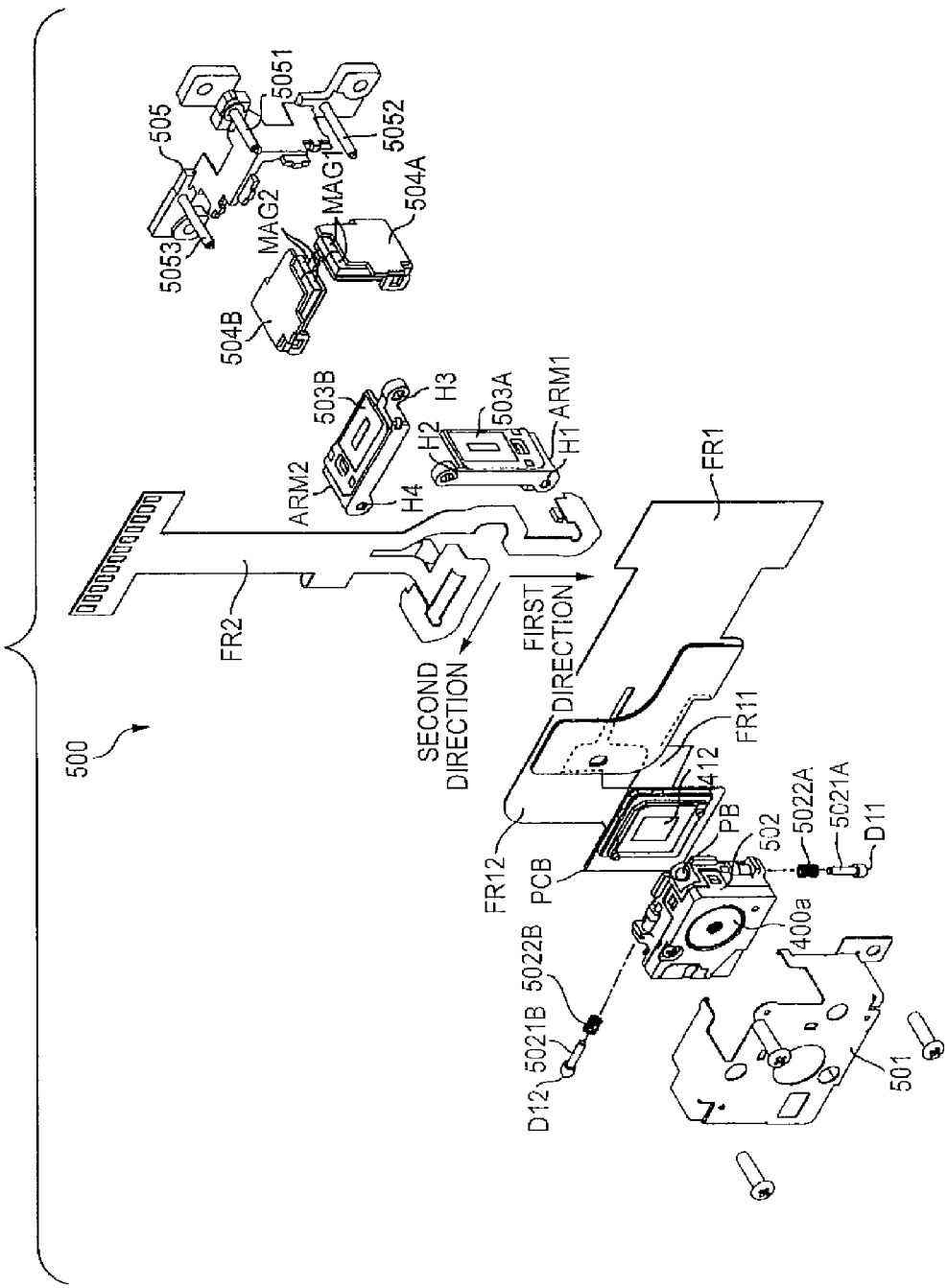
FIG. 19 is a view of another manner of pulling out a flexible board FR1.

Although the flexible board FRY may be pulled out from the holding module 502 as in the second embodiment, the flexible board FR1 may also be pulled out as in a third embodiment shown in FIG. 19.

FIG. 19 is a view to show another manner of extraction of the flexible board FR1.

According to the third embodiment, the portion of the flexible board FR1 extending outwardly first from the holding module 502 is divided to a first portion FR11 extending outwardly through between the axis point PB and first driving point D11 and a second portion FR12 extending outwardly through between the axis point PB and second driving point D11; and, the first and second portions FR11 and FR12 are pulled out separately and then they join together outside the holding module 502 to thereby constitute a single flexible board FR1. In this case as well, there can be provided the same effect.

As has been described heretofore, the invention can realize an image blur correcting unit structured such that a flexible board itself is difficult to deform and the flexible board is difficult to remove from its connecting portion, an image blur correcting device incorporating the image blur correcting unit therein, an image pickup apparatus incorporating the image blur correcting device therein, and compact portable equipment incorporating the image pickup apparatus therein.

Also, the invention can realize an image blur correcting unit which can be incorporated into the inside of a casing of portable equipment more compactly than ever.

As described above, it is possible to realize an image blur correcting unit in which a stress applied to a flexible board connected to a sensor board and drawn out to the external is reduced, an image blur correcting device comprising the image blur correcting unit, an image pickup apparatus comprising the image blur correcting device, and a portable equipment having the image pickup apparatus.

As has been described heretofore, there can be realized an image blur correcting unit structured such that a flexible board itself is difficult to deform and the flexible board is difficult to remove from its connecting portion, an image blur correcting device incorporating the image blur correcting unit therein, an image pickup apparatus incorporating the image blur correcting device therein, and portable equipment incorporating the image pickup apparatus therein.

The entire disclosure of each and every foreign patent application from which the benefit of foreign priority has been claimed in the present application is incorporated herein by reference, as if fully set forth.

What is claimed is:

1. An image blur correcting unit comprising:
a holding module that holds a lens and a sensor board having an image sensor, the image sensor receiving object light imaged by the lens to produce an image signal;
a support member that swingably supports the holding module in an arbitrary direction at an axis point that is a point on an outer circumference of the holding module;
first and second driving mechanisms that drive the holding module respectively via first and second driving points that are separated from the axis point in respective different first and second directions, wherein the first and second driving points are along the outer circumference of the holding module, the first driving mechanism swings the holding module via the first driving point about a first axis connecting the axis point and the second driving point, and the second driving mechanism swings the holding module via the second driving point about the second axis connecting the axis point and the first driving point; and
a flexible board in which its one end is connected to the sensor board and in which its surface portion elongates at least first from an edge of the sensor board on a plane of the sensor board, the surface portion elongating from an edge of the holding module toward an outside in a direction oblique to both the first and second directions,
wherein the surface portion of the flexible board extending first from the edge of the sensor board extends outwardly from the axis point of the holding module in a direction oblique to both the first and second directions.

2. An image blur correcting unit according to claim 1, wherein, the surface portion of the flexible board extending at least first from the edge of the sensor board in the oblique direction comprises a slit that extends in the oblique direction.

3. An image blur correcting unit according to claim 1, wherein the first and second driving points are respectively formed at positions where the second axis and the first axis intersect with each other at an angle of about 90 degrees, and
the surface portion of the flexible board extending at least first from the edge of the sensor board elongates from the edge of the holding module toward the outside in a direction which forms an angle of about 45 degrees with respect to both the first and second directions.

4. An image blur correcting unit according to claim 1, wherein each of the first and second driving mechanisms comprises:
a magnet that forms a magnetic field; and
a coil that is placed in the magnetic field and, when energized, produces a force for swinging the holding module.

5. An image blur correcting unit according to claim 1, wherein the holding module comprises a spherical convex portion at the axis point, and
the support member comprises a spherical concave face that receives the convex portion.

6. An image blur correcting unit according to claim 1, wherein the holding module comprises a spherical convex portion at each of the first and second driving points,
the first and second driving mechanisms comprise spherical concave portions that receive the convex portions provided in the first and second driving points, respectively, and
the first and second driving mechanisms give a driving force to the convex portions via the concave portions, respectively.

7. An image blur correcting unit according to claim 4, wherein the magnets respectively formed in the first and second driving mechanisms are fixedly supported by the support member, and
the coils respectively formed in the first and second driving mechanisms are supported by the support member to be movable in an optical axis direction of the lens, and, when energized, produce a force of the optical axis direction.

8. An image blur correcting unit according to claim 1, further including a cover that covers the holding module, the support member and the first and second driving mechanisms so as to define an outer shape of the image blur correcting unit, the cover having an electromagnetic shield function.

9. An image blur correcting device comprising:
an image blur correcting unit according to claim 1;
a shake detecting portion that detects a shake; and
a shake controlling portion that, in accordance with a detection result of the shake detecting portion, causes the first and second driving mechanisms to swing the holding module.

10. An image pickup apparatus comprising an image blur correcting device according to claim 9,
wherein the image pickup apparatus captures an object image and produces image data in which a blur is reduced by an operation of the image blur correcting device.

11. A portable equipment comprising an image pickup apparatus according to claim 10.

12. A portable equipment according to claim 11, further comprising a casing incorporating the image pickup apparatus therein,
wherein a portion of the image blur correcting unit except for the flexible board is disposed at a position near to one of side walls of the inside of the casing, and
the surface portion of the flexible board extending at least first from the edge of the sensor board extends, from a side distant from the one of the side walls, further away from the one of the side walls in a direction oblique to both the first and second directions.

13. A portable equipment according to claim 12,
wherein the portion of the image blur correcting unit except for the flexible board is a block having a rectangular parallelepiped shape,
the casing has a right and left direction dimension and a vertical direction dimension longer than the right and left direction dimension longer, and
the block is disposed at a position near to one of right and left walls of the inside of the casing in a direction where a right and left direction dimension of the block is longer than a vertical direction dimension of the block.

14. An image blur correcting unit, comprising:
a holding module that holds a lens and a sensor board having image sensor, the image sensor receiving object light imaged by the lens to produce an image signal;
a support member that swingably supports the holding module in an arbitrary direction at an axis point that is a point on an outer circumference of the holding module;
first and second driving mechanisms that drive the holding module respectively via first and second driving points that are separated from the axis point in respective different first and second directions, wherein the first and second driving points are along the outer circumference of the holding module, the first driving mechanism swings the holding module via the first driving point about a first axis connecting the axis point and the second driving point, and the second driving mechanism swings the holding module via the second driving point about the second axis connecting the axis point and the first driving point; and a flexible board in which its one end is connected to the sensor board, a surface of the flexible board extending outwardly from an edge of the holding module at least one of through a portion of the holding module existing near to the axis point between the axis point and the first driving point and through a portion of the holding module existing near to the axis point between the axis point and the second driving point, wherein the surface portion of the flexible board extending outwardly first from the edge of the holding module spreads both between the axis point and the first driving point and between the axis point and the second driving point and extends outwardly obliquely to both the first and second directions.

15. An image blur correcting unit according to claim 14, wherein the surface portion of the flexible board extending outwardly first from the holding module comprises:

a first surface portion extending outwardly through between the axis point and the first driving point; and a second surface portion extending outwardly through between the axis point and the second driving point, and wherein the first and second surface portions join together outside the holding module to constitute a single piece of flexible board.

16. An image blur correcting unit according to claim 14, wherein each of the first and second driving mechanisms comprises:

a magnet that forms a magnetic field; and a coil that is placed in the magnetic field and, when energized, produces a force for swinging the holding module.

17. An image blur correcting unit according to claim 14, wherein the holding module comprises a spherical convex portion at the axis point, and the support member comprises a spherical concave face that receives the convex portion.

18. An image blur correcting unit according to claim 14, wherein the holding module comprises a spherical convex portion at each of the first and second driving points, the first and second driving mechanisms comprise spherical concave portions that receive the convex portions provided in the first and second driving points, respectively, and the first and second driving mechanisms give a driving force to the convex portions via the concave portions, respectively.

19. An image blur correcting unit according to claim 16, wherein the magnets respectively formed in the first and second driving mechanisms are fixedly supported by the support member, and the coils respectively formed in the first and second driving mechanisms are supported by the support member to be movable in an optical axis direction of the lens, and, when energized, produce a force in the optical axis direction.

20. An image blur correcting unit according to claim 14, further including a cover that covers the holding module, the support member and the first and second driving mechanisms so as to define an outer shape of the image blur correcting unit, the cover having an electromagnetic shield function.

21. An image blur correcting device comprising:

an image blur correcting unit according to claim 14;

a shake detecting portion that detects a shake; and a shake controlling portion that, in accordance with a detection result of the shake detecting portion, causes the first and second driving mechanisms to swing the holding module.

22. An image pickup apparatus comprising an image blur correcting device according to claim 21, wherein the image pickup apparatus captures an object image and produces image data in which a blur is reduced by an operation of the image blur correcting device.

23. A portable equipment comprising an image pickup apparatus according to claim 22.

24. A portable equipment according to claim 23, further comprising a casing incorporating the image pickup apparatus therein, wherein a portion of the image blur correcting unit except for the flexible board is a block having a rectangular parallelepiped shape, and the block is disposed within the casing in such a manner that a side surface of the block spreading parallel to an optical axis of the lens exists in the vicinity of an end face of the casing and extends parallel to the end face.

25. A portable equipment according to claim 24, wherein the casing has an oblong shape, and the block is disposed within the casing in such a manner that a longitudinal direction of the block extends along an end face of the casing extending in a short side direction of the casing.

26. A portable equipment according to claim 24, wherein the block is disposed within the casing in such a manner that an opposing corner of the axis point is situated in a corner portion of the casing.

* * * * *